US008750880B2

(12) United States Patent
Matsuo et al.

(10) Patent No.: US 8,750,880 B2
(45) Date of Patent: Jun. 10, 2014

(54) HANDOVER PREPROCESSING SYSTEM, MOBILE TERMINAL, BASE STATION

(75) Inventors: Hidenori Matsuo, Kanagawa (JP);
Takahisa Aoyama, Kanagawa (JP);
Takashi Tamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 72 days.

(21) Appl. No.: 13/519,607

(22) PCT Filed: Jan. 13, 2011

(86) PCT No.: PCT/JP2011/000155
§ 371 (c)(1),
(2), (4) Date: Jun. 28, 2012

(87) PCT Pub. No.: WO2011/086934
PCT Pub. Date: Jul. 21, 2011

(65) Prior Publication Data
US 2012/0295625 A1 Nov. 22, 2012

(30) Foreign Application Priority Data

Jan. 15, 2010 (JP) ................................. 2010-006481
Mar. 30, 2010 (JP) ................................. 2010-076727

(51) Int. Cl.
*H04W 36/00* (2009.01)

(52) U.S. Cl.
USPC ........... 455/438; 455/436; 455/437; 370/331; 370/332

(58) Field of Classification Search
USPC .......... 370/331, 332; 455/436–439, 440–441, 455/550.1, 552.1
See application file for complete search history.

(56) References Cited

U.S. PATENT DOCUMENTS 7,020,439 B2 * 3/2006 Sinivaara et al. ............. 455/41.2
7,907,949 B2 * 3/2011 Matsuzawa et al. .......... 455/436

(Continued)

FOREIGN PATENT DOCUMENTS

JP 2007-251368 A 9/2007
WO 2009095970 A1 8/2009

OTHER PUBLICATIONS

"Way forward for handover to HeNB", 3GPP TSG-RAN WG2 meeting #63 Notes R2-084736, Jeju, Korea, Aug. 18-22, 2008.

(Continued)

*Primary Examiner* — Kamran Afshar
*Assistant Examiner* — Farideh Madani
(74) *Attorney, Agent, or Firm* — Pearne & Gordon LLP

(57) ABSTRACT

A technology is disclosed that provides a handover preprocessing system and the like, the handover preprocessing system capable of eliminating waste of resources used as a result of notification being reissued of a CSG cell for which access is not granted. According to the technology, the handover preprocessing system is configured by: a base station 100 that is an object for connection of a mobile terminal 300, provides a plurality of cells indicating a range accessible by the mobile terminal, and transmits, to the mobile terminal, notification information including frequency information of each cell; the mobile terminal that verifies access permission for the cells based on the notification information received from the base station and, when access permission is not granted, generates a first message including frequency information corresponding to the cell for which access permission is not granted and transmits the first message to a connecting base station 200 to which the mobile terminal itself is currently connected; and the connecting base station that transmits, to the mobile terminal, a second message including a command giving an instruction to select a frequency other than a frequency specified by the frequency information included in the first message, based on the first message received from the mobile terminal.

20 Claims, 21 Drawing Sheets

(56) References Cited

U.S. PATENT DOCUMENTS

2009/0082021 A1    3/2009   Matsuzawa et al.
2009/0092097 A1*   4/2009   Nylander et al. ............ 370/331
2011/0287768 A1*   11/2011   Takamatsu et al. ........... 455/444

OTHER PUBLICATIONS

International Search Report for PCT/JP2011/000155 dated Feb. 8, 2011.

* cited by examiner

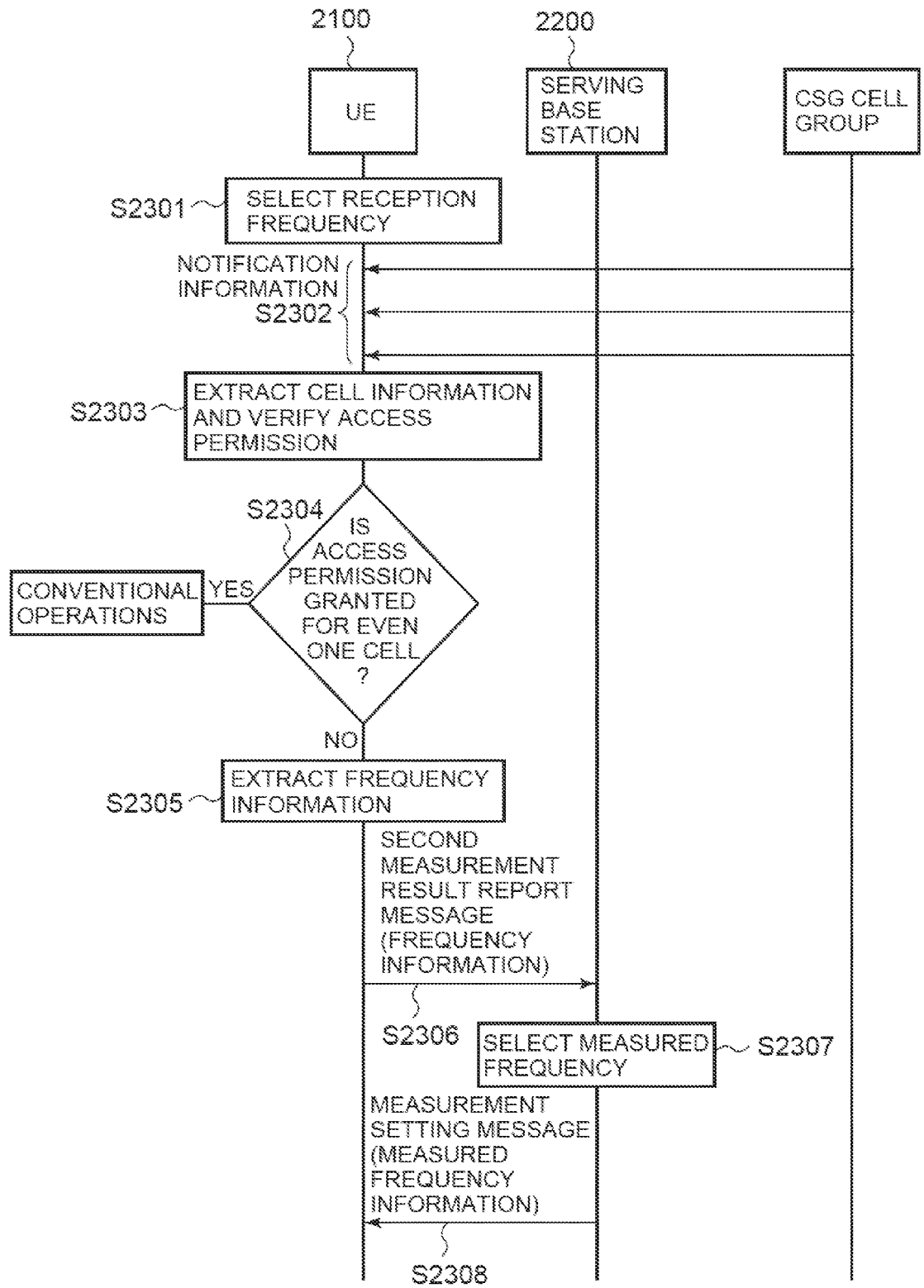

HANDOVER PREPROCESSING SYSTEM, MOBILE TERMINAL, BASE STATION

TECHNICAL FIELD

The present invention relates to a handover preprocessing system, a mobile terminal, and a base station performing handover preprocessing performed when specifying a handover destination of a mobile terminal.

BACKGROUND ART

In 3GPP, setting up a home base station (Home eNodeB or Home NodeB; referred to, hereinafter, as "HeNB" or "HNB") and constructing a CSG cell is being studied (refer to Non-patent Document 1). As shown in FIG. 17, the CSG cell is constructed within a cell (macro-cell 1701) constructed by ordinary base stations (eNB). Unlike the eNB, the HeNB is provided with a function enabling restriction of terminals (user equipment; referred to, hereinafter, as "UE") that are permitted access, and a UE (terminal) can only connect to a CSG cell for which access permission is granted. Excluding emergencies, the UE (terminal) is unable to connect without access permission regardless of a CSG cell with high reception quality being detected.

To verify access permission for a CSG cell, the UE (terminal) is required to verify cell identification information included in notification information transmitted from the CSG cell (base station). Each CSG cell has an ID, referred to as a CSG ID, in group units, and access permission is granted to the UE (terminal) in CSG ID units. The UE (terminal) collates a CSG ID list (access permission list: CSG white list) of accessible CSG cells, notification of which has been received from a network, and the CSG ID that is the cell identification information received from the notification information of the CSG cell, and judges that access is possible if the CSG ID of the detected CSG cell is included in the CSG white list. The CSG ID is referred to, hereinafter, as access permission information.

All cells have cell identification information referred to as a physical cell ID (PCI). Regarding the CSG cell, as shown in FIG. 18, CSG cells having the same PCI may be present near a serving base station 1801 (serving cell) to which the UE (terminal) is currently connected. This is referred to as a PCI collision. The UE (terminal) measures reception quality for signals from near-by cells, and a trigger is performed when the reception quality of the serving base station 1801 or a near-by cell satisfies certain conditions. This is referred to as an event trigger.

When the trigger is performed, the serving base station 1801 receives notification of the PCI of the cell having high reception quality by a measurement result report message (measurement report). Based on the reception quality information, the serving base station 1801 decides a handover destination and transmits a handover request message (handover request; HO request) to the handover destination cell. In this instance, if a PCI collision occurs, the serving base station 1801 may transmit the handover request message (handover request; HO request) to the wrong cell. This is referred to as PCI confusion.

To prevent PCI confusion, the UE (terminal) detects a cell global ID (CGI) that is a unique cell identifier from the notification information of the CSG cell, and notifies the serving base station 1801 of the CGI using the measurement result report message. The serving base station 1801 specifies the CSG cell from the notification. However, time is required to detect the CGI from the notification information. Therefore, first, notification is given of the PCI of the cell having high reception quality and the measured reception quality by a first measurement result report message (1st measurement report). The serving base station 1801 selects one handover destination candidate cell from the cells within the received first measurement result report message. When the selected cell is a CSG cell, to instruct the UE (terminal) to detect the CGI of the CSG cell, the serving base station 1801 transmits a measurement setting message (measurement configuration) including the PCI of the CSG cell and setting information required for detecting the CGI to the UE (terminal).

The UE (terminal) detects system information (SI) including the CGI from the notification information of the CSG cell of which instruction has been given based on the measurement setting message (referred to as SI reading), and performs access verification using the access permission information (CSG ID). Then, the UE (terminal) notifies the serving base station 1801 of the cell information of the CSG cell from the system information and the access verification result after access verification processing by a second measurement result report message (2nd measurement report). In addition, during system information detection, the serving base station 1801 sets a gap or DRX for interrupting data transmission to the UE (terminal), thereby enabling the UE (terminal) to detect the system information of nearby base stations. An example of a sequence of the above-described operation is shown in FIG. 19.

Here, when the access permission information included in the second measurement result report message is "no access permission (non-member)", a serving base station 2001 gives an instruction, by the measurement setting message, to measure a frequency (e.g. f2) other than the frequency (e.g. f1) supported by the CSG cell (CSG cell 1) of which the UE has given notification, as shown in FIG. 20.

PRIOR ART DOCUMENT

Non-Patent Document

Non-patent Document 1: "Way forward for handover to HeNB", 3GPP TSG-RAN WG2 meeting #63 Notes R2-084736

In an instance in which a HeNB 2002 has CSG cells (e.g. CSG cell 1 and CSG cell 2) that support a plurality of frequencies (e.g. f1 and f2) as shown in FIG. 20, when the serving base station 2001 gives an instruction to measure, as the other frequency, a frequency (e.g. f2) supported by another CSG cell provided by the same HeNB 2002 as that of the CSG cell (e.g. CSG cell 1) of which the UE has already given notification as a "non-member", the UE reissues notification to the serving base station 2001 of a CSG cell (e.g. CSG cell 2) for which access permission is not granted. As a result, resources used in accompaniment with this notification are wasted.

SUMMARY OF THE INVENTION

In light of the above-described issues, an object of the present invention is to provide a handover preprocessing system, a mobile terminal, and a base station capable of eliminating waste of resources used as a result of notification being reissued of a CSG cell for which access permission is not granted.

To achieve the above-described object, the present invention provides a handover preprocessing system that performs preprocessing for specifying a handover destination of a mobile terminal, the handover preprocessing system including: a base station that is an object for connection of the mobile terminal, provides a plurality of cells indicating a range accessible by the mobile terminal, and transmits, to the mobile terminal, notification information including frequency information of each cell; the mobile terminal that verifies access permission for the cells based on the notification information received from the base station and, when the access permission is not granted, generates a first message (equivalent to a second measurement result report message, described hereafter) including frequency information corresponding to the cell for which the access permission is not granted and transmits the first message to a connecting base station to which the mobile terminal itself is currently connected; and the connecting base station that transmits, to the mobile terminal, a second message (equivalent to a measurement setting message, described hereafter) including a command giving an instruction to select a frequency other than a frequency specified by the frequency information included in the first message, based on the first message received from the mobile terminal. As a result of the configuration, waste of resources used as a result of notification being reissued of a CSG cell for which access permission is not granted can be eliminated.

According to the present invention, a mobile terminal in a handover preprocessing system that performs preprocessing for specifying a handover destination of the mobile terminal is provided, the mobile terminal including: a receiving means for receiving notification information from a base station, the base station being an object for connection of the mobile terminal, providing a plurality of cells indicating a range accessible by the mobile terminal, and transmitting the notification information including frequency information of each cell; an access permission verifying means for verifying access permission for the cells based on the received notification information; an extracting means for extracting, when the access permission is not granted, frequency information corresponding to the cell for which the access permission is not granted; and a control means for generating a first message (equivalent to a second measurement result report message, described hereafter) including the extracted frequency information and transmitting the first message to a connecting base station to which the mobile terminal itself is currently connected. As a result of the configuration, waste of resources used as a result of notification being reissued of a CSG cell for which access permission is not granted can be eliminated.

According to the present invention, a base station that is an object for connection of a mobile terminal in a handover preprocessing system that performs preprocessing for specifying a handover destination of the mobile terminal is provided, the base station including: a storage means for storing notification information including frequency information of each of a plurality of cells provided by the base station and indicating a range accessible by the mobile terminal; and a control means for acquiring the frequency information of the cells from the storage means, generating a notification information including the acquired frequency information, and transmitting the notification information to the mobile terminal. As a result of the configuration, waste of resources used as a result of notification being reissued of a CSG cell for which access permission is not granted can be eliminated.

According to the present invention, a base station to which a mobile terminal is currently connected in a handover preprocessing system that performs preprocessing for specifying a handover destination of the mobile terminal is provided, the base station including: a receiving means for receiving a first message (equivalent to a second measurement result report message, described hereafter) when the mobile terminal that has received notification information transmitted from a connection object base station that is an object for connection of the mobile terminal, the notification information including frequency information of each of a plurality of cells provided by the base station and indicating a range accessible by the mobile terminal, verifies access permission for the cells based on the notification information and the access permission is not granted, the first message being generated by the mobile terminal and including frequency information corresponding to the cell for which the access permission is not granted; and a control means for generating a second message (equivalent to a measurement setting message, described hereafter) including a command giving an instruction to select a frequency other than a frequency specified by the frequency information included in the first message, based on the received first message, and transmitting the second message to the mobile terminal. As a result of the configuration, waste of resources used as a result of notification being reissued of a CSG cell for which access permission is not granted can be eliminated.

According to the present invention, a handover preprocessing system that performs preprocessing for specifying a handover destination of a mobile terminal is provided, the handover preprocessing system including: the mobile terminal that receives notification information within a predetermined period, the notification information including frequency information that is the same as the frequency information selected in advance among frequency information of each of a plurality of cells provided by a base station that is an object for connection of the mobile terminal and indicating a range accessible by the mobile terminal, verifies access permission for the cells based on the received notification information and, when the access permission is not granted, generates a first message including the frequency information corresponding to the cell for which the access permission is not granted and transmits the first message to a connecting base station to which the mobile terminal itself is currently connected; and the connecting base station that transmits, to the mobile terminal, a second message including a command giving an instruction to select a frequency other than a frequency specified by the frequency information included in the first message, based on the first message received from the mobile terminal. As a result of the configuration, needless signaling can be suppressed without additional notification information being transmitted. The predetermined period is equivalent to a gap, described hereafter.

According to the present invention, a mobile terminal in a handover preprocessing system that performs preprocessing for specifying a handover destination of the mobile terminal is provided, the mobile terminal including: a frequency selecting means for selecting, in advance, frequency information to be received; a receiving means for receiving notification information within a predetermined period, the notification information including frequency information that is the same as the selected frequency information among frequency information of each of a plurality of cells provided by a base station that is an object for connection of the mobile terminal and indicating a range accessible by the mobile terminal; an access permission verifying means for verifying access permission for the cells based on the received notification information; an extracting means for extracting, when the access permission is not granted, frequency information corresponding to the cell for which the access permission is not granted; and a control means for generating a first message including the extracted frequency information and transmitting the first message to a connecting base station to which the mobile terminal itself is currently connected. As a result of the configuration, needless signaling can be suppressed without additional notification information being transmitted.

According to the present invention, a base station to which a mobile terminal is currently connected in a handover preprocessing system that performs preprocessing for specifying a handover destination of the mobile terminal is provided, the base station including: a receiving means for receiving a first message, when the mobile terminal that has received notification information with a predetermined period, the notification information including frequency information that is the same as the frequency information selected in advance among frequency information of each of a plurality of cells provided by a connection object base station that is an object for connection of the mobile terminal and indicating a range accessible by the mobile terminal, verifies access permission for the cells based on the notification information and, when extracting frequency information corresponding to the cell for which the access permission is not granted, generates the first message including at least frequency information that is not extracted; and a control means for generating a second message including a command giving an instruction to select a frequency specified by the frequency information that is not extracted included in the first message, based on the received first message, and transmitting the second message to the mobile terminal. As a result of the configuration, needless signaling can be suppressed without additional notification information being transmitted.

The present invention assumes that, when the access permission information included in the first message is "no access permission (non-member)", as shown in FIG. 20, the serving base station 2001 gives an instruction in the measurement setting message to measure a frequency (e.g. f2) other than the frequency (e.g. f1) supported by the CSG cell (CSG cell 1) of which the UE has given notification. However, when the CSG cell base station gives notification of information referred to as a binary IFRI bit, for example, when the value of the IFRI bit is "TRUE", the serving base station selects a cell to be the handover destination from among the CSG cells having a frequency that is the same as the frequency (e.g. f1) of which notification has been given by the UE, without giving the instruction to measure a frequency (e.g. f2) other than the frequency (e.g. f1) of which the UE has given notification. On the other hand, when the value of the IFRI bit is "FALSE", the serving base station gives an instruction to measure another frequency (e.g. f2). Therefore, when the CSG cell base station gives notification of the IFRI bit, the present invention is applied only when the IFRI bit is "FALSE". In this instance, the value of the IFRI bit from the notification information received by the UE from the CSG cell base station is included in the first message.

The handover preprocessing system, the mobile terminal, and the base station of the present invention can eliminate waste of resources used as a result of notification being reissued of a CSG cell for which access permission is not granted.

BRIEF DESCRIPTION OF THE DRAWINGS

FIG. 23 is a sequence chart of an example of a processing sequence according to the sixth embodiment of the present invention.

DESCRIPTION OF EMBODIMENTS

First Embodiment

The point according to a first embodiment is that a HeNB (CSG cell base station) that provides (supports) a plurality of CSG cells give notification of notification information including information on frequencies corresponding to the CSG cells provided by the HeNB itself. When a UE detects a "non-member (no access permission)" CSG cell, the UE notifies a serving base station of the frequency information of "non-member" CSG cells provided by the same HeNB acquired from the notification information.

As a specific operation, first, the CSG cell base station gives notification of all frequency information (all pieces of frequency information) corresponding to the CSG cells provided by the CSG cell base station itself. The UE verifies access permission from system information (SI) of which notification has been received from the CSG cell base station. When access permission is not granted, the UE adds, to a second measurement result report message, all frequency information of the CSG cells for which access permission is not granted that is acquired from the notification information from the CSG cell base station. The serving base station that has received the second measurement result report message to which the frequency information of the CSG cells has been added instructs the UE to measure a frequency other than the frequencies of the CSG cells of which notification has been received. When the CSG cell base station provides an extension cell referred to as an extension carrier, because communication cannot be performed by the extension cell alone, frequency information of the extension carrier may be added to the second measurement result report message.

A function referred to as automatic neighbor relation (ANR) may be used, in which the serving base station collects information on nearby CSG cells in advance, without relying on notification of the frequency information of the CSG cells from the UE by the second measurement result report message. As a result, when the CSG cell of which notification is given during reception of the second measurement result report message is a "non-member", as the frequency to be measured by the UE, a frequency other than the frequencies supported by the CSG cells of the same HeNB as that of the "non-member" CSG cell may be selected based on the nearby cell information collected through ANR.

ANR is a function in which a base station collects nearby cell information from the content of a measurement result report message from a UE connected to the base station. As an indicator for judging, from the collected information of each CSG cell, whether or not the CSG cells are provided by the same HeNB, for example, an eNB ID that is an ID assigned to each base station can be considered. The eNB ID can be extracted from the CGI included in the nearby cell information within the measurement result report message from the UE.

Figure 1:
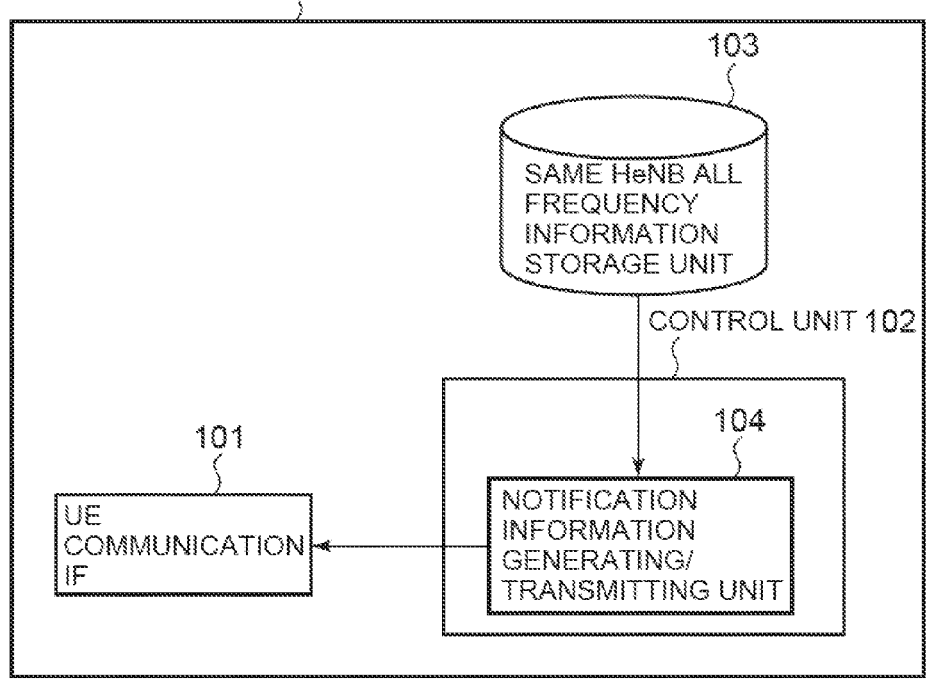
FIG. 1 is a configuration diagram of an example of a configuration of a CSG cell base station according to a first embodiment of the present invention.
Figure 2:
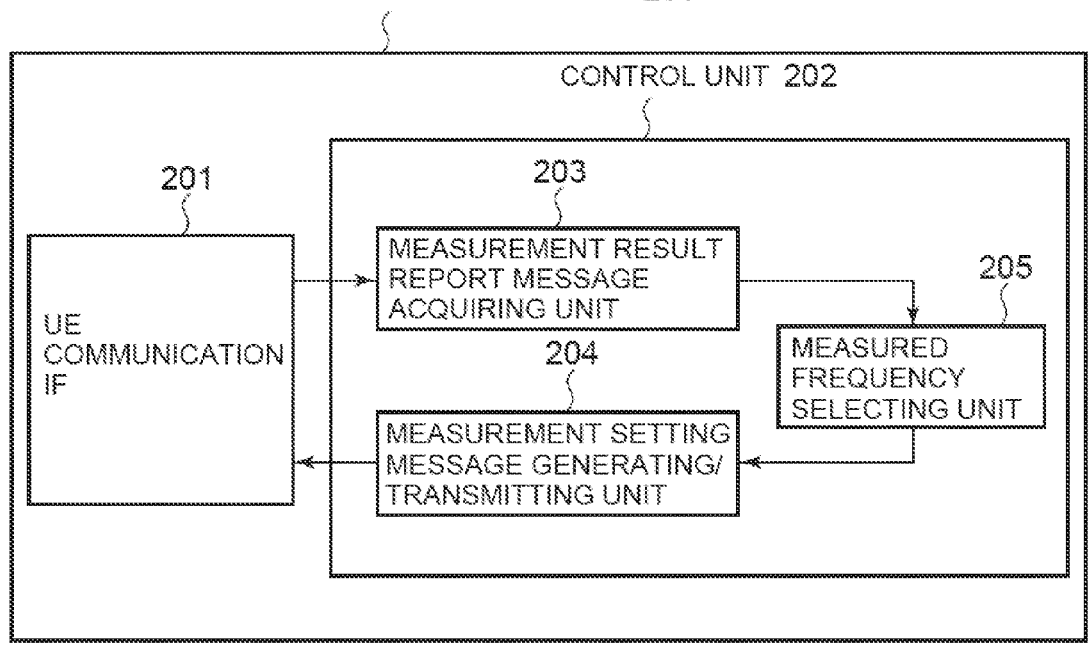
FIG. 2 is a configuration diagram of an example of a configuration of a serving base station according to the first embodiment of the present invention.
Figure 3:
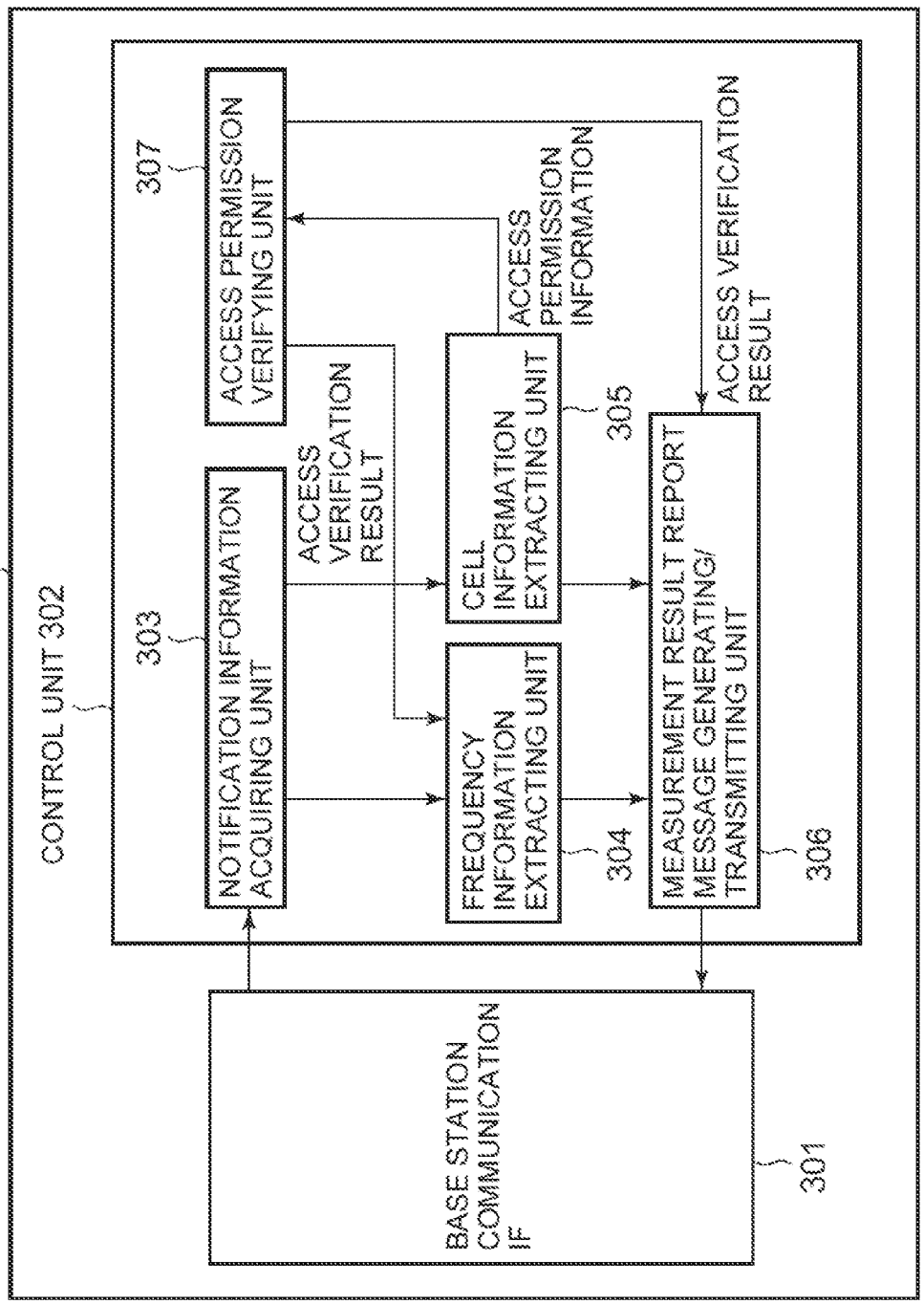
FIG. 3 is a configuration diagram of an example of a configuration of a UE according to the first embodiment of the present invention.

According to the first embodiment, unlike in the prior art, the UE can be prevented from reissuing a notification to the serving base station of a CSG cell for which access permission is not granted provided by the same HeNB. As a result, waste of wireless resources can be prevented, and the UE can quickly give notification of a cell to which handover can be performed. As a result, the serving base station can be prevented from receiving notifications from the UE numerous times, and waste of resources of the serving base station can also be prevented. FIG. 1, FIG. 2, and FIG. 3 are diagrams respectively showing of examples of the configurations of the CSG cell base station, the serving base station, and the UE according to the first embodiment.

As shown in FIG. 1, a CSG cell base station 100 is configured by a UE communication interface (IF) 101, a control unit 102, and a same HeNB all frequency information storage unit 103. The control unit 102 includes a notification information generating/transmitting unit 104. The UE communication IF 101 is an interface used when communicating with a UE 300 and the like. The control unit 102 controls operations of the CSG cell base station 100. The notification information generating/transmitting unit 104 within the control unit 102 generates notification information and the like, the notification information for notifying the UE 300 of frequency information (may include cell information (SI) related to each cell, in addition to the frequency information; the same applies to other embodiments described hereafter), and transmits the generated notification information and the like to the UE 300 via the UE communication IF 101. The same HeNB all frequency information storage unit 103 stores frequency information supported by the same HeNB.

In addition, as shown in FIG. 2, a serving base station 200 is configured by a UE communication IF 201 and a control unit 202. The control unit 202 is configured by a measurement result report message acquiring unit 203, a measurement setting message generating/transmitting unit 204, and a measured frequency selecting unit 205. The UE communication IF 201 is an interface used when communicating with the UE 300 and the like. The control unit 202 controls the operations of the serving base station 200. The measurement result report message acquiring unit 203 within the control unit 202 acquires a measurement result report message (equivalent to the second measurement result report message) from the UE 300 received via the UE communication IF 201, and transmits the acquired measurement result report message to the measured frequency selecting unit 205.

The measured frequency selecting unit 205 judges whether or not the frequency of a CSG cell for which access permission is not granted is included, based on the measurement result report message. When judged that the frequency is included, the measurement setting message generating/transmitting unit 204 generates a measurement setting message for making the UE 300 measure a frequency other than the frequency of which notification (report) has been given, and transmits the generated measurement setting message to the UE 300 via the UE communication IF 201.

In addition, as shown in FIG. 3, the UE 300 is configured by a base station communication IF 301 and a control unit 302. The control unit 302 is configured by a notification information acquiring unit 303, a frequency information extracting unit 304, a cell information extracting unit 305, a measurement result report message generating/transmitting unit 306, and an access permission verifying unit 307. The base station communication IF 301 is an interface used when communicating with the serving base station, the CSG cell base station, and the like. The control unit 302 controls the operations of the UE 300. The notification information acquiring unit 303 acquires, via the base station communication IF 301, the notification information including the frequency information of which notification is received from the CSG cell base station.

The cell information extracting unit 305 extracts cell information based on the acquired notification information. The access permission verifying unit 307 verifies access permission based on the extracted cell information. The frequency information extracting unit 304 extracts frequency information for which access permission is not granted. The measurement result report message generating/transmitting unit 306 generates the second measurement result report message including the extracted frequency information and transmits the second measurement result report message via the base station communication IF 301.

Figure 4:
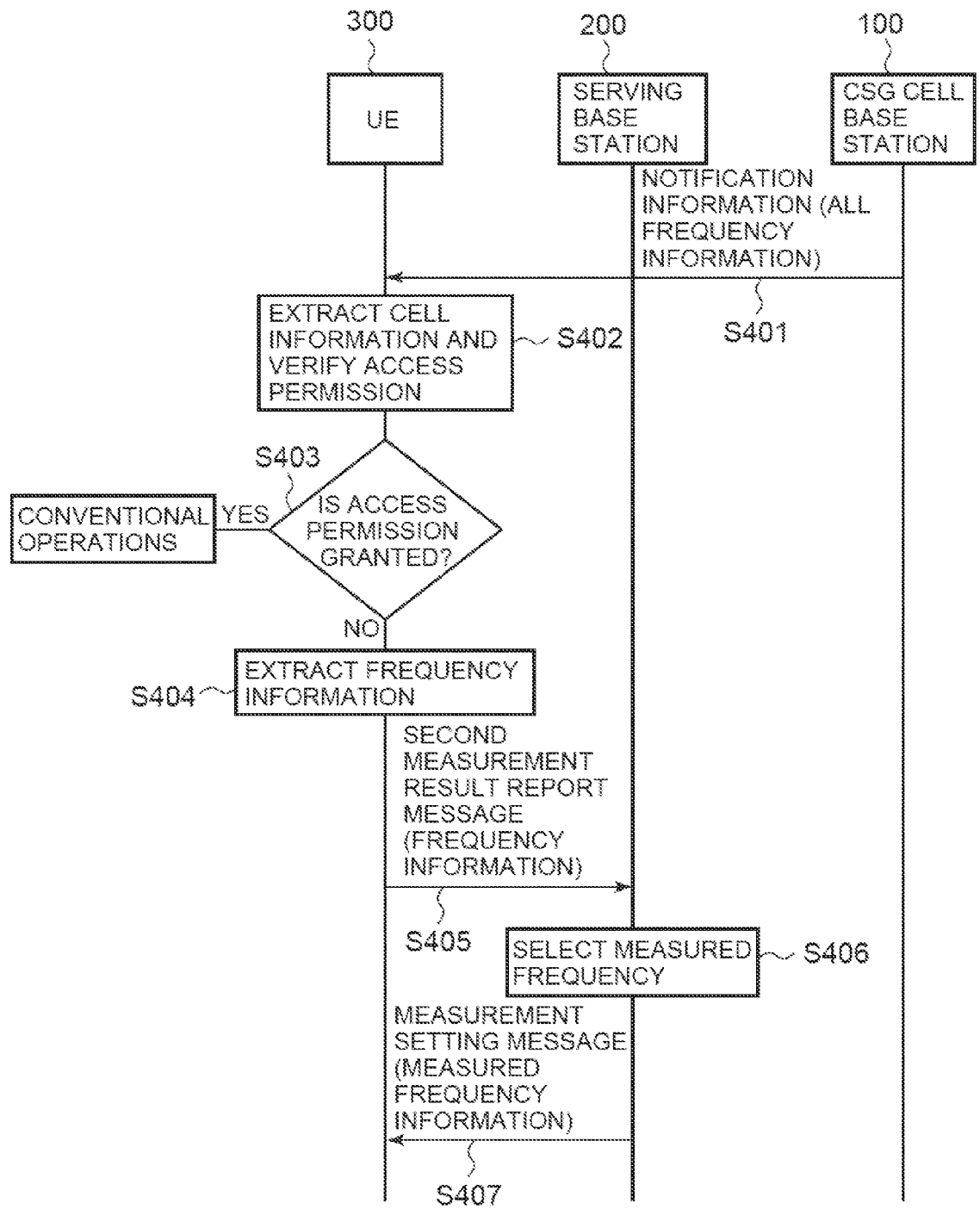
FIG. 4 is a sequence chart of an example of a processing sequence according to the first embodiment of the present invention.

An example of a processing sequence according to the first embodiment will be described with reference to FIG. 4. As shown in FIG. 4, the CSG cell base station 100 gives notification of the notification information including all frequency information of the CSG cells provided by the CSG cell base station 100 itself (Step S401). The UE 300 performs extraction of cell information from the notification information and performs access permission verification (Step S402). UE 300 judges whether or not access permission is granted (Step S403). When access permission is not granted, the UE 300 extracts the frequency information of the cell for which access permission is not granted (Step S404), adds the extracted frequency information to the second measurement result report message, and transmits the second measurement result report message to the serving base station 200 (Step S405).

The serving base station 200 that has received the second measurement result report message instructs the UE to measure a frequency other than the frequency of the CSG cell of which notification has been received. In other words, to make the UE measure a frequency other than the frequency of the CSG cell of which notification has been received, the serving base station 200 generates a command or the like giving an instruction to select a frequency other than the frequency of the CSG cell of which notification has been given (measured frequency selection) (Step S406). The serving base station 200 generates a measurement setting message including the generated command (measured frequency information) and transmits the measurement setting information to the UE 300 (Step S407). At Step S403, when judged that access permission is granted, conventional operations are performed.

Second Embodiment

The first embodiment is suitable for instances in which the CSG cells supported by the same HeNB have almost the same coverage. According to the second embodiment, an instance is described in which the coverage differs.

Figure 5:
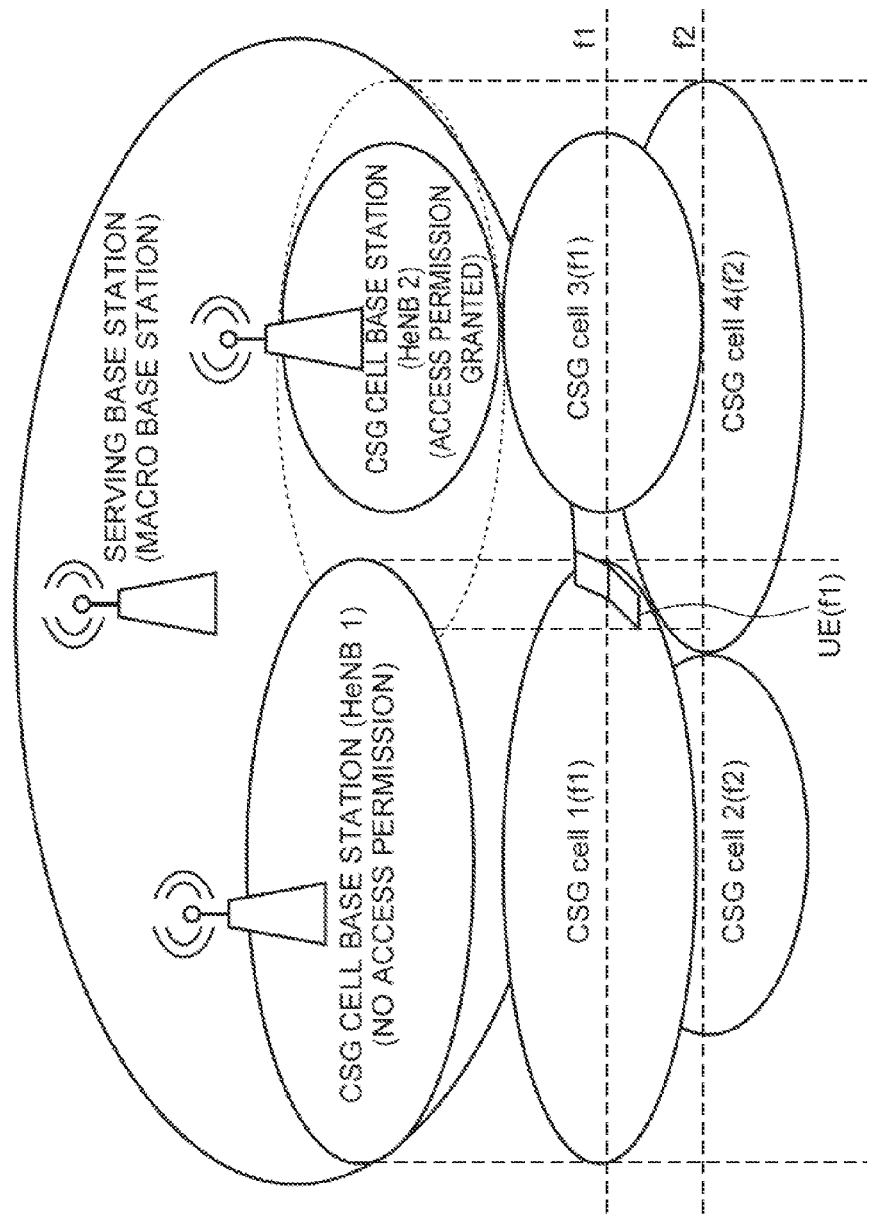
FIG. 5 is a diagram of CSG cells having differing coverage for each frequency according to a second embodiment of the present invention.

As shown in FIG. 5, regarding a frequency (f2) corresponding to a CSG cell (CSG cell 2) having a small coverage among the CSG cells provided by the same HeNB as the HeNB providing the "non-member" CSG cell (CSG cell 1), the UE may detect an "access permission granted (member)" CSG cell (CSG cell 4) provided by a different HeNB. Therefore, in this instance, the serving base station is required to prevent f2 from being eliminated as a frequency that the UE is instructed to measure after notification of "non-member" is given by the second measurement result report message.

Therefore, according to the second embodiment, only the frequency of a CSG cell having equivalent or greater coverage than that of the CSG cell base station itself that is giving notification is selected from all frequencies supported by the same HeNB. As a result, the UE does not notify the serving base station of the frequency corresponding to a CSG cell having a small coverage using the second measurement result report message, thereby enabling the UE to measure this frequency.

According to the second embodiment, even when the HeNB provides CSG cells having differing coverage, the UE can be prevented from reissuing notification to the serving base station of a CSG cell for which access permission is not granted provided by the same HeNB. As a result, waste of wireless resources can be prevented, and the UE can quickly give notification of a cell to which handover can be performed. An example of a configuration of the CSG cell base station according to the second embodiment will be described with reference to FIG. 6. The configurations of the serving base station and the UE are similar to those according to the first embodiment. Therefore, descriptions thereof are omitted.

Figure 6:
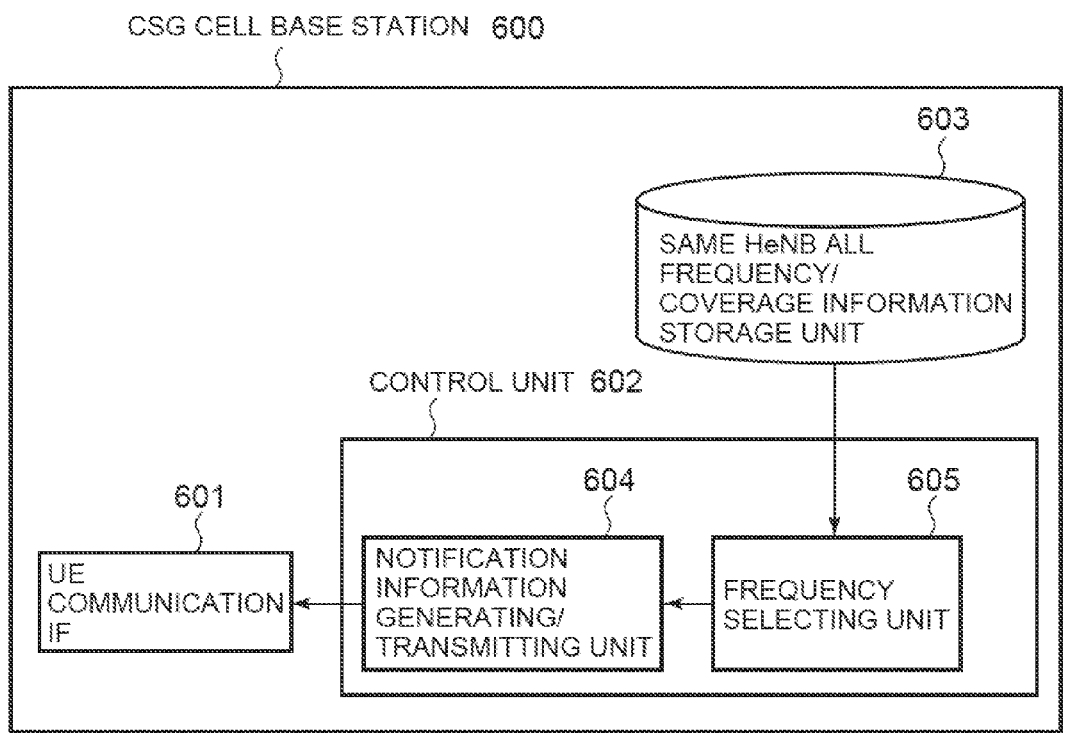
FIG. 6 is a configuration diagram of an example of a configuration of a CSG cell base station according to the second embodiment of the present invention.

As shown in FIG. 6, a CSG cell base station 600 is configured by a UE communication IF 601, a control unit 602, and a same HeNB all frequency/coverage information storage unit 603. The control unit 602 includes a notification information generating/transmitting unit 604 and a frequency selecting unit 605. The UE communication IF 601 is an interface used when communicating with the UE and the like. The control unit 602 controls the operations of the CSG cell base station 600. The notification information generating/transmitting unit 604 within the control unit 602 generates notification information and the like, the notification information for notifying the UE of frequency information selected by the frequency selecting unit 605, and transmits the notification information and the like to the UE via the UE communication IF 601. In other words, the notification information is transmitted to the UE as notification information including frequency information of a cell having equivalent or greater coverage than the coverage of the CSG cell base station 600 itself.

The frequency selecting unit 605 selects the information of the frequency of the CSG cell having equivalent or greater coverage than the coverage of the CSG cell base station 600 itself. The same HeNB all frequency/coverage information storage unit 603 stores frequency information and coverage information supported by the same HeNB.

Figure 7:
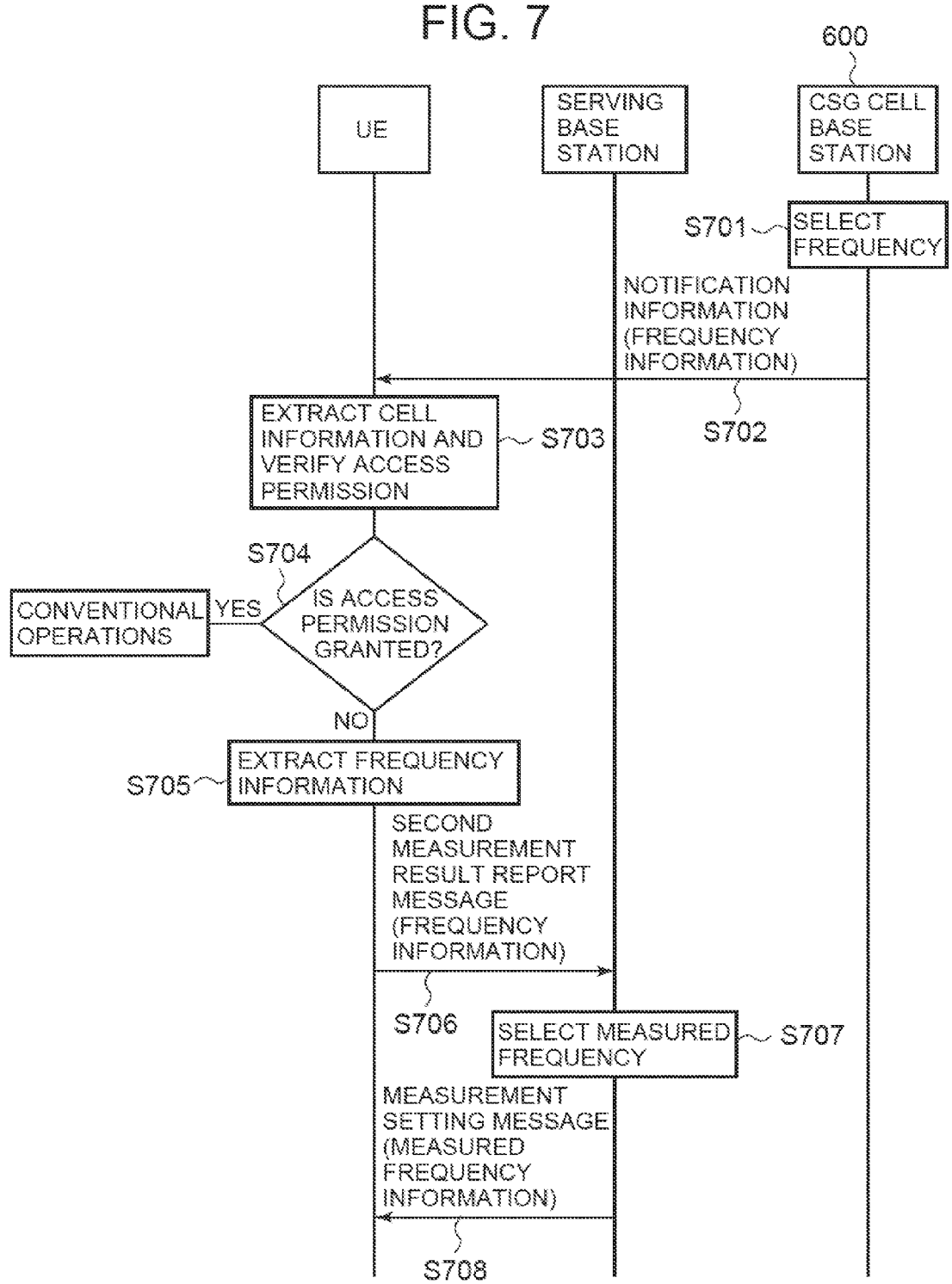
FIG. 7 is a sequence chart of an example of a processing sequence according to the second embodiment of the present invention.

An example of a processing sequence according to the second embodiment will be described with reference to FIG. 7. As shown in FIG. 7, the CSG cell base station 600 selects the information of the frequency of the CSG cell having equivalent or greater coverage than the coverage of the CSG cell base station 600 itself (frequency selection: Step S701). The CSG cell base station 600 gives notification of the notification information including the selected frequency information (Step S702). The UE performs extraction of cell information from the received notification information and performs access permission verification (Step S703). The UE judges whether or not access permission is granted (Step S704). When access permission is not granted, the UE extracts the frequency information of the cell for which access permission is not granted (Step S705), adds the extracted frequency information to the second measurement result report message, and transmits the second measurement result report message to the serving base station (Step S706).

The serving base station that has received the second measurement result report message instructs the UE to measure a frequency other than the frequency of the CSG cell of which notification has been received. In other words, to make the UE measure a frequency other than the frequency of the CSG cell of which notification has been received, the serving base station generates a command or the like giving an instruction to select a frequency other than the frequency of the CSG cell of which notification has been given (measured frequency selection) (Step S707). The serving base station generates a measurement setting message including the generated command (measured frequency information) and transmits the measurement setting information to the UE 300 (Step S708). At Step S704, when judged that access permission is granted, conventional operations are performed.

Third Embodiment

Figure 8:
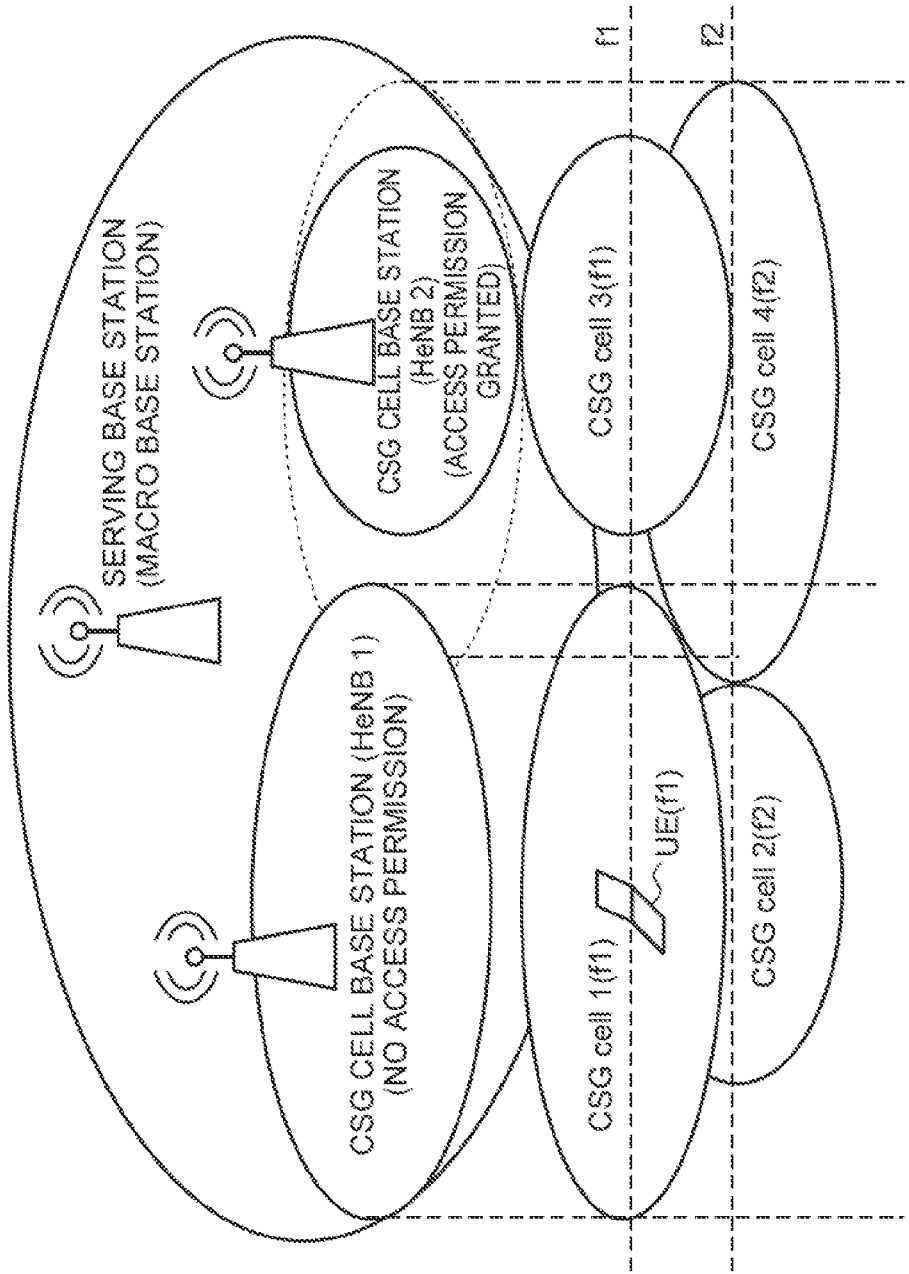
FIG. 8 is a diagram of CSG cells having differing coverage for each frequency in an instance in which a UE is near a HeNB, according to a third embodiment of the present invention.

According to the second embodiment, the serving base station can instruct the UE to measure the frequency corresponding to a CSG cell having a small coverage. As shown in FIG. 8, when the UE is near a HeNB 1 that provides a "non-member" CSG cell, even when the serving base station instructs the UE to measure the frequency (f2) corresponding to the CSG cell (CSG cell 2) with a small coverage, the UE again detects the "non-member" CSG cell (CSG cell 2) because the UE is near the HeNB 1.

Therefore, according to a third embodiment, the UE measures the reception quality of the CSG cell before transmitting the second measurement result report message. When the reception quality of the "non-member" CSG cell is a certain threshold value or more, the UE recognizes that it is near the HeNB. Even when the CSG cell has a small coverage, the UE adds the corresponding frequency information to the second measurement result report message. In other words, regardless of coverage, all frequency information supported by the HeNB is added, in a manner similar to that according to the first embodiment.

On the other hand, when the reception quality is the certain threshold value or less, the UE recognizes that it is not near the HeNB and does not add the frequency information corresponding to the CSG cell having a small coverage to the second measurement result report message, in a manner similar to that according to the second embodiment. Notification of the information on the threshold value is given by the CSG cell base station. The threshold value is set as a reception quality of a degree allowing reception of a CSG cell having the smallest coverage among the CSG cells supported by the same HeNB. As the reception quality, path loss indicating propagation path attenuation or reception power of the CSG cell can be considered.

Figure 9:
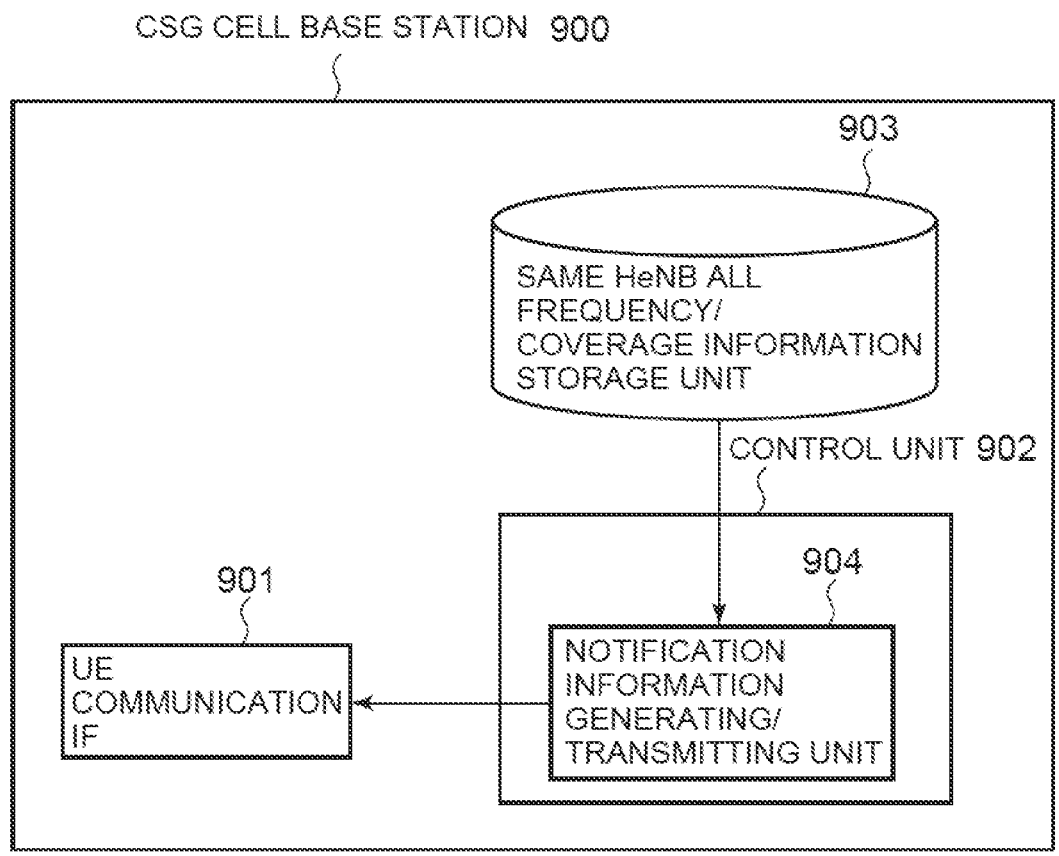
FIG. 9 is a configuration diagram of an example of a configuration of a CSG cell base station according to the third embodiment of the present invention.
Figure 10:
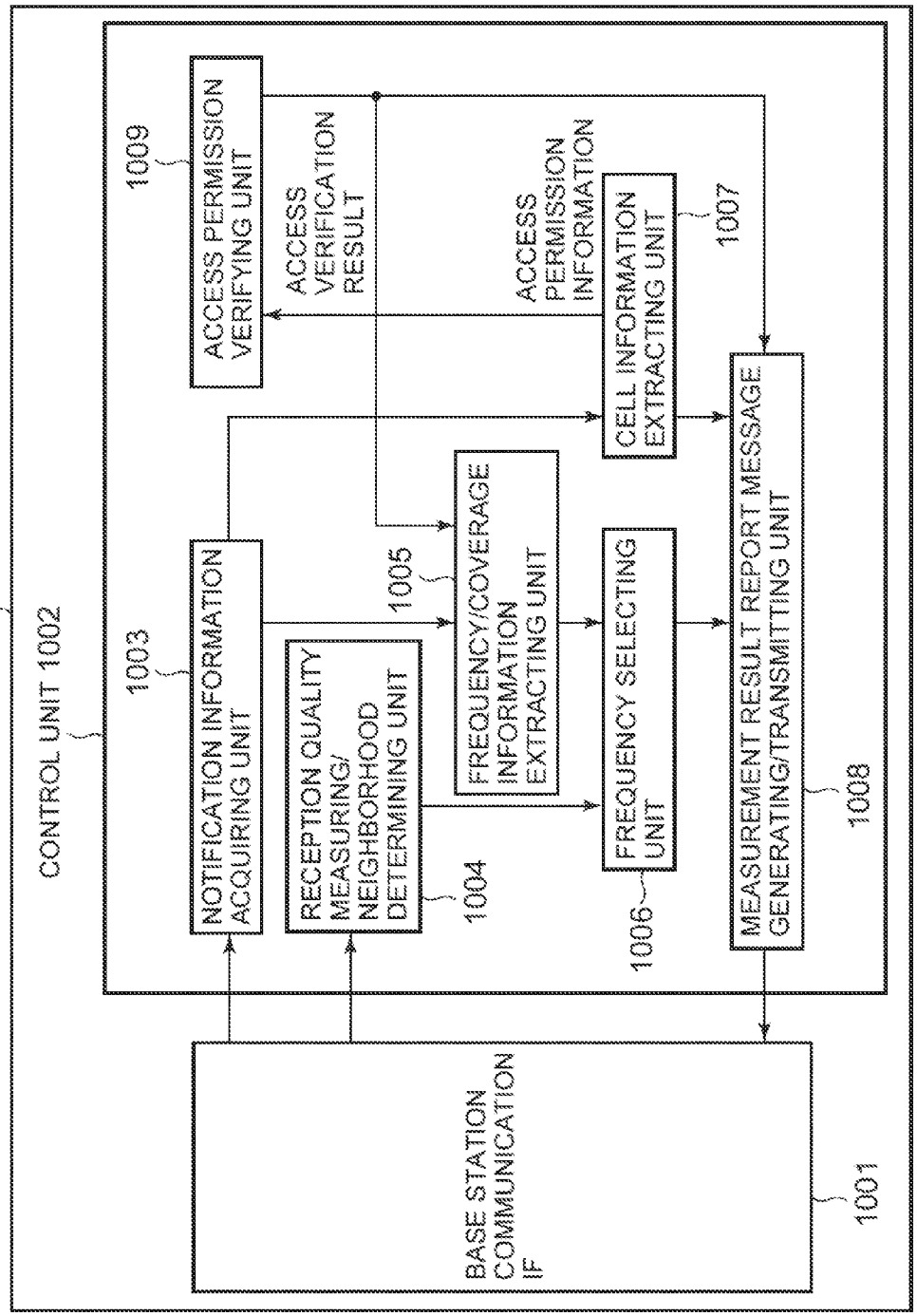
FIG. 10 is a configuration diagram of an example of a configuration of a UE according to the third embodiment of the present invention.

For the UE to select the frequency of the CSG cell having a small coverage, in addition to the frequency information of which notification is given according to the first embodiment, coverage information of the CSG cell corresponding to each frequency is also added. As the coverage information, for example, a flag can be considered that indicates whether the coverage of another CSG cell is equivalent or greater, or less than equivalent in comparison with that of the CSG cell itself that is giving notification. According to the third embodiment, the UE can be more optimally prevented from reissuing a notification to the serving base station of a CSG cell for which access permission is not granted, depending on the state of the UE. FIG. 9 and FIG. 10 are diagrams respectively showing examples of the configurations of the CSG cell base station and the UE. The configuration of the serving base station is similar to that according to the first embodiment. Therefore, description thereof is omitted.

As shown in FIG. 9, a CSG cell base station 900 is configured by a UE communication IF 901, a control unit 902, and a same HeNB all frequency/coverage information storage unit 903. The control unit 902 includes a notification information generating/transmitting unit 904. The UE communication IF 901 is an interface used when communicating with a UE 1000 and the like. The control unit 902 controls the operations of the CSG cell base station 900. The notification information generating/transmitting unit 904 within the control unit 902 generates notification information and the like, the notification information for notifying the UE 1000 of frequency information and coverage information, and transmits the notification information and the like to the UE 1000 via the UE communication IF 601. In other words, the notification information is transmitted to the UE 1000 with the coverage information of the cell included therein. The same HeNB all frequency/coverage information storage unit 903 stores the frequency information and the coverage information supported by the same HeNB.

As shown in FIG. 10, the UE 1000 is configured by a base station communication IF 1001 and a control unit 1002. The control unit 1002 is configured by a notification information acquiring unit 1003, a reception quality measuring/neighborhood determining unit 1004, a frequency/coverage information extracting unit 1005, a frequency selecting unit 1006, a cell information extracting unit 1007, a measurement result report message generating/transmitting unit 1008, and an access permission verifying unit 1009. The base station communication IF 1001 is an interface used when communicating with the serving base station, the CSG cell base station 900, and the like. The control unit 1002 controls the operations of the UE 1000. The notification information acquiring unit 1003 within the control unit 1002 acquires, via the base station communication IF 1001, the notification information including the frequency information and the coverage information of which notification has been received from the CSG cell base station.

The reception quality measuring/neighborhood determining unit 1004 measures the reception quality of the CSG cell, and judges whether or not the reception quality of a "non-member" CSG cell is a threshold value or more. The frequency/coverage information extracting unit 1005 extracts the frequency information and the coverage information from the acquired notification information. The frequency selecting unit 1006 selects the frequency information to be added to the second measurement result report message based on the determination by the reception quality measuring/neighborhood determining unit 1004. The cell information extracting unit 1007 extracts the cell information based on the acquired notification information. The measurement result report message generating/transmission unit 1008 generates the second measurement report message including the selected frequency information and transmits the second measurement report message via the base station communication IF 1009. The access permission verifying unit 1009 verifies access permission based on the extracted cell information.

In other words, when the UE 1000 generates the second measurement result report message, the UE 1000 measures the reception quality of a cell for which access permission is not granted. When the reception quality is a predetermined threshold value or more, the UE 1000 generates the second measurement result report message as a message including the frequency information corresponding to the cell for which access permission is not granted. When the reception quality is less than the predetermined threshold value, the UE 1000 generates the second measurement result report message as a message including the frequency information of a cell having equivalent or greater coverage than the coverage of a relevant cell.

Figure 11:
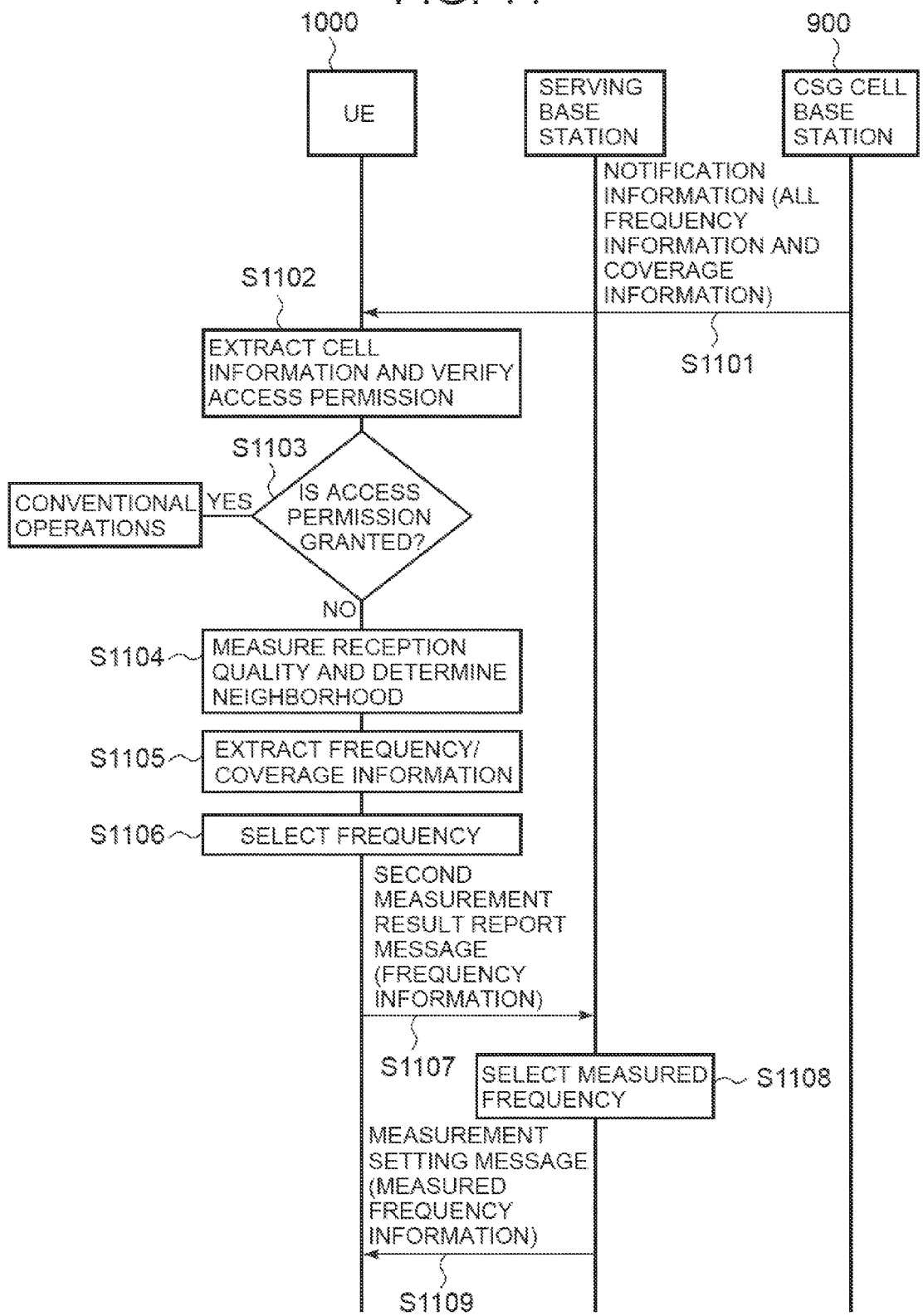
FIG. 11 is a sequence chart of an example of a processing sequence according to the third embodiment of the present invention.

An example of a processing sequence according to the third embodiment will be described with reference to FIG. 11. As shown in FIG. 11, the CSG cell base station 900 gives notification of the notification information including all frequency information and coverage information of the CSG cells provided by the same HeNB (Step S1101). The UE 1000 performs extraction of cell information from the received notification information and performs access permission verification (Step S1102). The UE 1000 judges whether or not access permission is granted (Step S1103). When access permission is not granted, the UE 1000 measures the reception quality of the CSG cell for which access permission is not granted and judges whether or not the reception quality is a threshold value or more (reception quality measurement and neighborhood determination: Step S1104).

The UE 1000 extracts the frequency information and the coverage information from the notification information (Step S1105). When judged that the reception quality is the threshold value or more, the UE 1000 recognizes that it is near the HeNB and selects all frequency information provided by the HeNB. On the other hand, when judged that the reception quality is not the threshold value or more, the UE 1000 recognizes that it is not near the HeNB and does not select the frequency information corresponding to a CSG cell having a small coverage, but rather, selects other frequency information (frequency selection: Step S1106).

The UE 1000 generates the second measurement result report message including the selected frequency information and transmits the second measurement result report message to the serving base station (Step S1107). The serving base station that has received the second measurement result report message instructs the UE to measure a frequency other than the frequency of the CSG cell of which notification has been received. In other words, to make the UE measure a frequency other than the frequency of the CSG cell of which notification has been received, the serving base station generates a command or the like giving an instruction to select a frequency other than the frequency of the CSG cell of which notification has been given (measured frequency selection) (Step S1108) and generates a measurement setting message including the generated command (measured frequency information) and transmits the measurement setting information to the UE 300 (Step S1109). At Step S1103, when judged that access permission is granted, conventional operations are performed.

Fourth Embodiment

Figure 12:
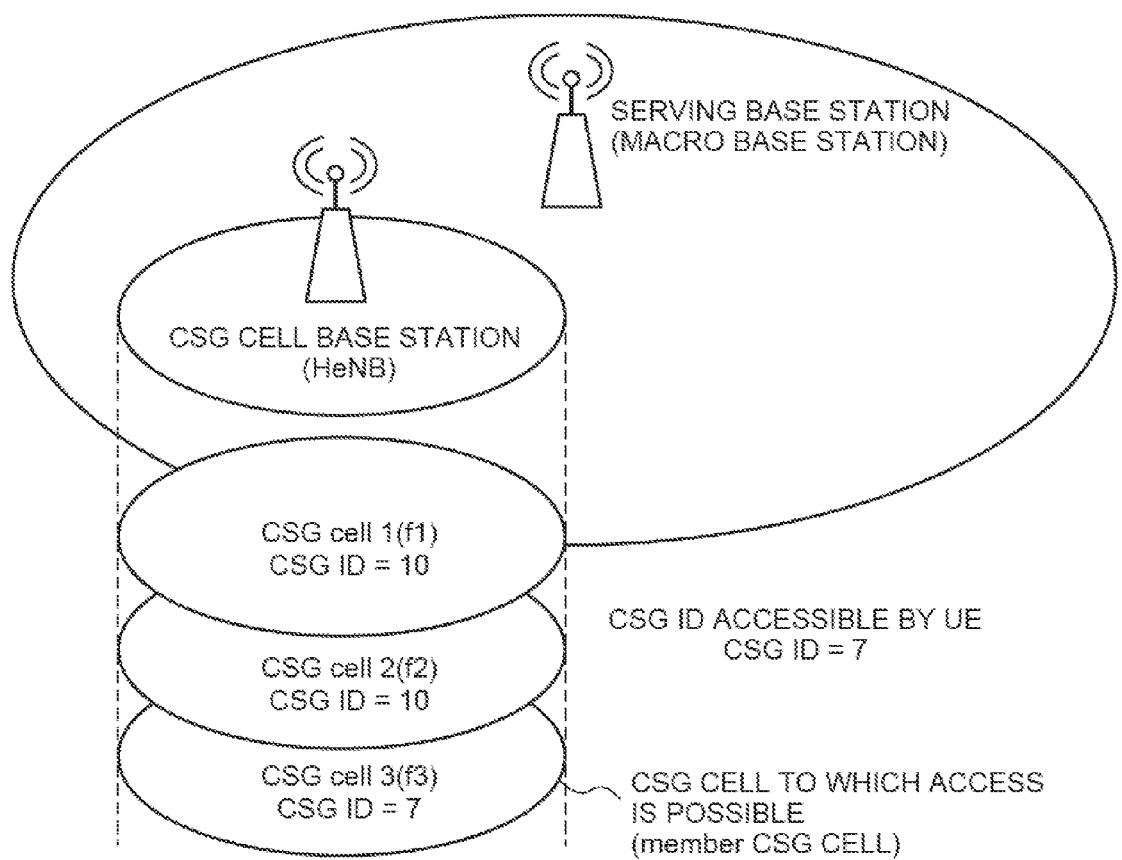
FIG. 12 is a diagram showing a single HeNB providing a member CSG cell and non-member CSG cells according to a fourth embodiment of the present invention.

As shown in FIG. 12, a fourth embodiment is an embodiment in which the HeNB provides both CSG cells to which the UE is granted access permission (member) and CSG cells to which the UE is not granted access permission (non-member) to the UE.

Figure 13:
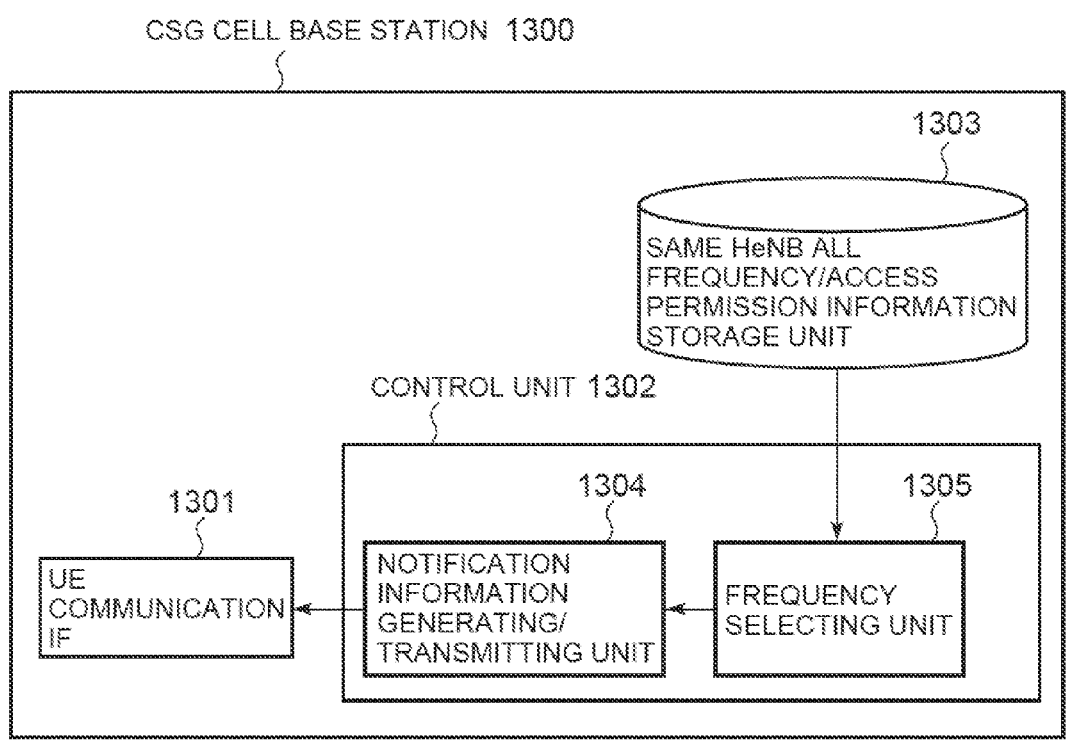
FIG. 13 is a configuration diagram of an example of a configuration of a CSG cell base station according to the fourth embodiment of the present invention.

Specifically, unlike that according to the first embodiment, the CSG cell base station does not give notification of all frequency information as the information of which notification is given, but rather selects and gives notification of only the frequency information of a CSG cell having the same access permission information (CSG ID) as the CSG cell base station itself. According to the fourth embodiment, even when the HeNB provides CSG cells having differing access permission information (CSG ID), the UE can be prevented from reissuing notification to the serving base station of a CSG cell for which access permission is not granted provided by the same HeNB. As a result, waste of wireless resources can be prevented, and the UE can quickly give notification of a cell to which handover can be performed. An example of a configuration of the CSG cell base station according to the fourth embodiment is shown in FIG. 13. The configurations of the serving base station and the UE, and the processing sequence are similar to those according to the second embodiment. Therefore, descriptions thereof are omitted.

As shown in FIG. 13, a CSG cell base station 1300 is configured by a UE communication IF 1301, a control unit 1302, and a same HeNB all frequency/access permission information storage unit 1303. The control unit 1302 includes a notification information generating/transmitting unit 1304 and a frequency selecting unit 1305. The UE communication IF 1301 is an interface used when communicating with the UE and the like. The control unit 1302 controls the operations of the CSG cell base station 1300. The notification information generating/transmitting unit 1304 within the control unit 1302 generates notification information and the like, the notification information for notifying the UE of frequency information selected by the frequency selecting unit 1305, and transmits the notification information and the like to the UE via the UE communication IF 1301. In other words, the CSG cell base station 1300 transmits the notification information as notification information including the frequency information of a same cell having the access permission information for judging whether or not access to a cell is possible.

The frequency selecting unit 1305 selects the frequency information of a CSG cell having the same access permission information as the CSG cell base Station 1300 itself. The same HeNB all frequency/access permission information storage unit 1303 stores frequency information and access permission information supported by the same HeNB.

Fifth Embodiment

According to a fifth embodiment, the CSG cell base station gives notification of information (frequency information and access permission information) on all CSG cells provided by the same HeNB. The UE gives notification of only the frequency corresponding to a non-member CSG cell by the second measurement result report message.

Specifically, as information of which notification is given by the CSG cell base station, notification is given of all frequency information and access permission information (CSG ID) of the CSG cells supported by the same HeNB. As a result of performing access permission verification processing, when a CSG cell is a "non-member", the UE performs access permission verification processing using the access permission information (CSG ID) of another CSG cell included in the notification information of the "non-member" CSG cell. The UE selects the frequency information of the "non-member" CSG cell and adds the frequency information to the second measurement result report message. When a "member" CSG cell is detected as a result of the access permission verification processing, the UE gives notification of information on the CSG cell for which access permission is granted by the second measurement result report message, thereby enabling the start of handover processing to the CSG cell. When the notification information includes information of a hybrid cell having both a function of a CSG cell having access restrictions and a function of an open cell having no access restrictions, notification of the hybrid cell information is given in the second measurement result report message, thereby enabling the start of handover processing to the hybrid cell using the open-cell function.

Figure 14:
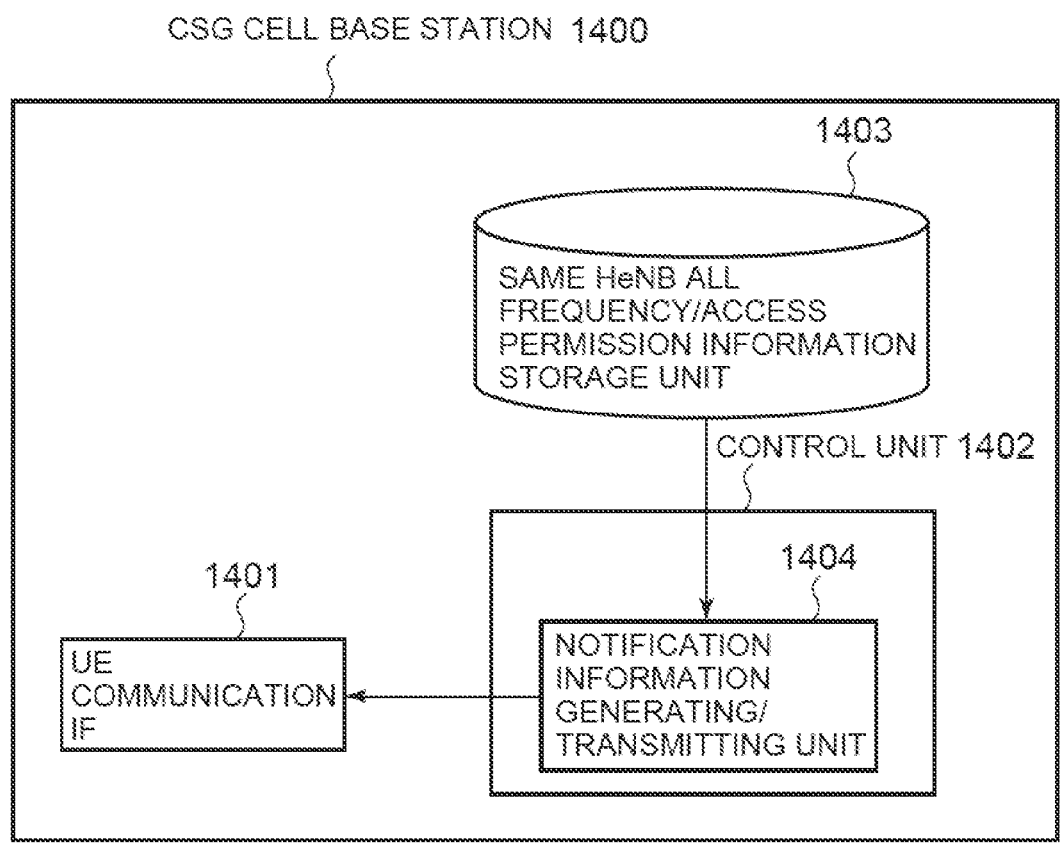
FIG. 14 is a configuration diagram of an example of a configuration of a CSG cell base station according to a fifth embodiment of the present invention.
Figure 15:
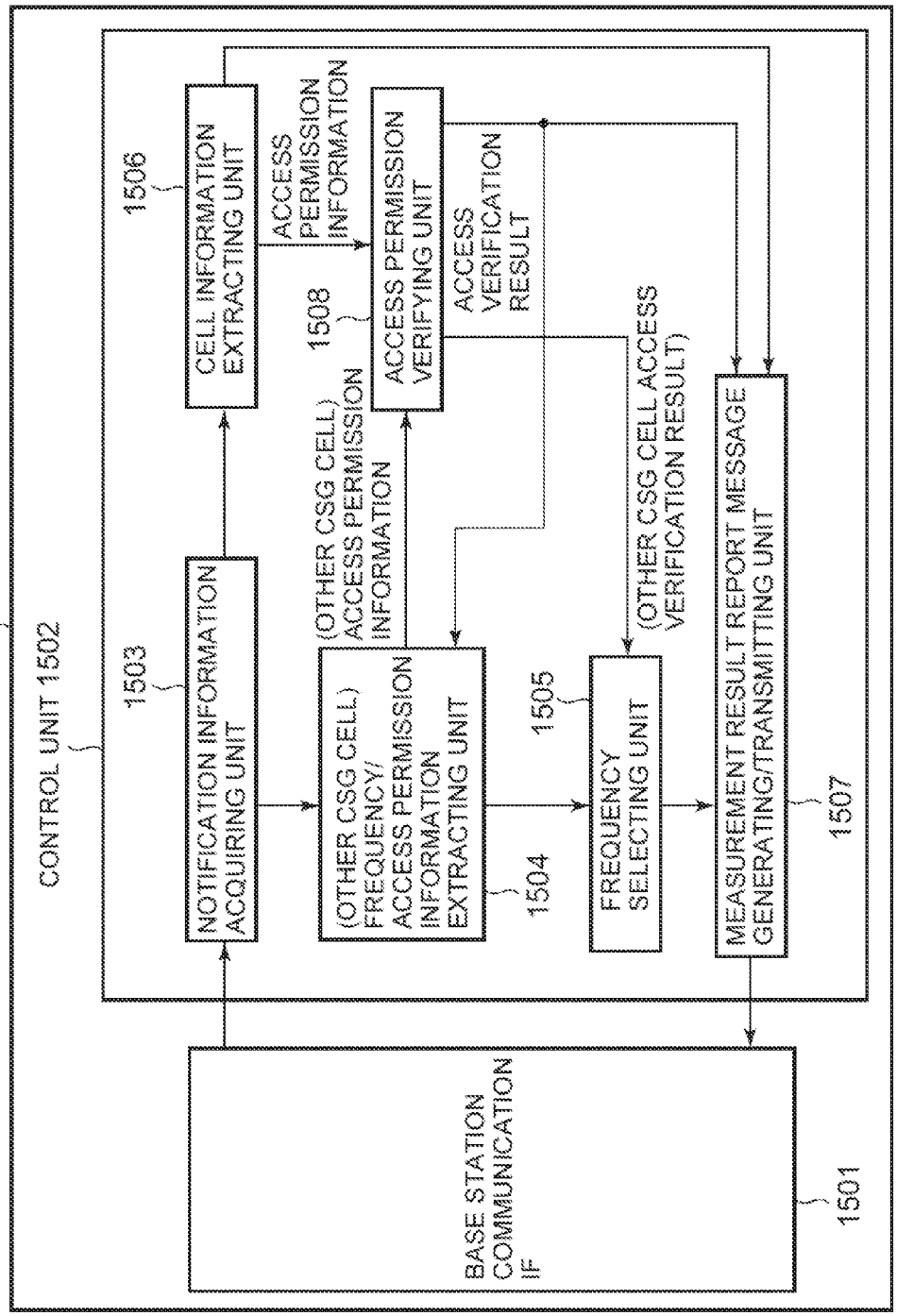
FIG. 15 is a configuration diagram of an example of a configuration of a UE according to the fifth embodiment of the present invention.

Examples of the configurations of the CSG cell base station and the UE according to the fifth embodiment are respectively shown in FIG. 14 and FIG. 15. The configuration of the serving base station according to the fifth embodiment is similar to that according to the first embodiment. Therefore, description thereof is omitted.

As shown in FIG. 14, a CSG cell base station 1400 is configured by a UE communication IF 1401, a control unit 1402, and a same HeNB all frequency/access permission information storage unit 1403. The control unit 1402 includes a notification information generating/transmitting unit 1404. The UE communication IF 1401 is an interface used when communicating with a UE 1500 and the like. The control unit 1402 controls the operations of the CSG cell base station 1400. The notification information generating/transmitting unit 1404 within the control unit 1402 generates notification information and the like, the notification information for notifying the UE 1500 of frequency information and access permission information, and transmits the notification information and the like to the UE 1500 via the UE communication IF 1401. In other words, the CSG cell base station 1400 includes the access permission information for judging whether or not access to the cell is possible to the notification information and transmits the notification information to the UE 1500. The same HeNB all frequency/access permission information storage unit 1403 stores frequency information and access permission information supported by the same HeNB.

As shown in FIG. 15, the UE 1500 is configured by a base station communication IF 1501 and a control unit 1502. The control unit 1502 is configured by a notification information acquiring unit 1503, (other CSG cell) frequency/access permission information extracting unit 1504, a frequency selecting unit 1505, a cell information extracting unit 1506, a measurement result report message generating/transmitting unit 1507, and an access permission verifying unit 1508. The base station communication IF 1501 is an interface used when communicating with the serving base station, the CSG cell base station 1400, and the like. The control unit 1502 controls the operations of the UE 1500. The notification information acquiring unit 1503 within the control unit 1502 acquires, via the base station communication IF 1501, the notification information including the frequency information and the access permission information of which notification has been received from the CSG cell base station 1400.

The (other CSG cell) frequency/access permission information extracting unit 1504 extracts the frequency information and the access permission information from the acquired notification information. The frequency selecting unit 1505 selects the frequency information to be added to the second measurement result report message based on the result of extraction by the (other CSG cell) frequency/access permission information extracting unit 1504 and the result of access verification by the access permission verifying unit 1508. The cell information extracting unit 1506 extracts the cell information based on the acquired notification information. The measurement result report message generating/transmitting unit 1507 generates the second measurement result report message including the selected frequency information and transmits the second measurement result report message via the base station communication IF 1501. The access permission verifying unit 1508 verifies access permission based on the extracted cell information and access permission information.

In other words, when generating the second measurement result report message, the UE 1500 performs verification processing for access permission for another cell using the access permission information included in the notification information of the cell for which access permission is not granted, and generates the second measurement result report message as a message including the frequency information corresponding to the cell for which access permission is not granted.

Figure 16:
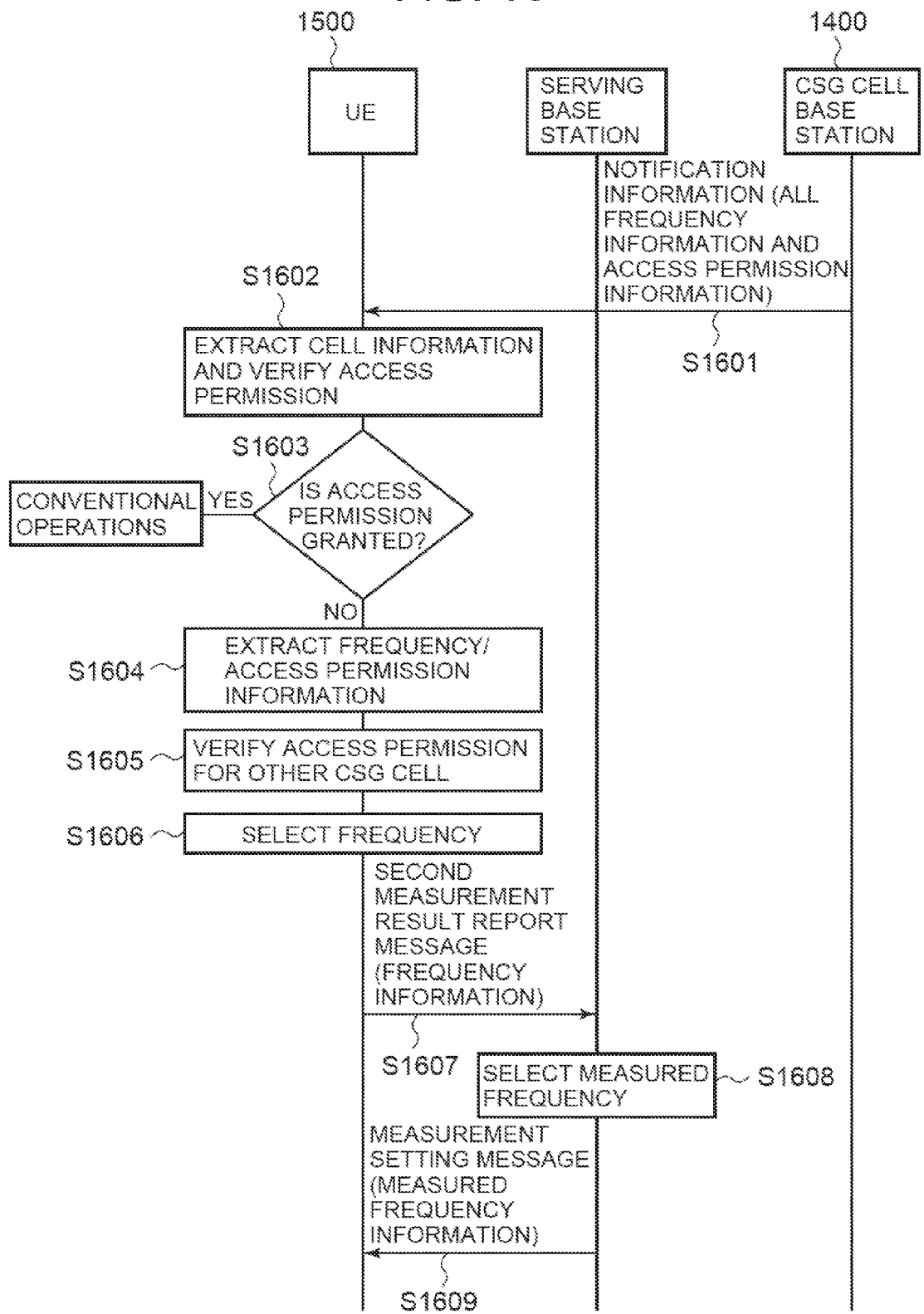
FIG. 16 is a sequence chart of an example of a processing sequence according to the fifth embodiment of the present invention.
Figure 17:
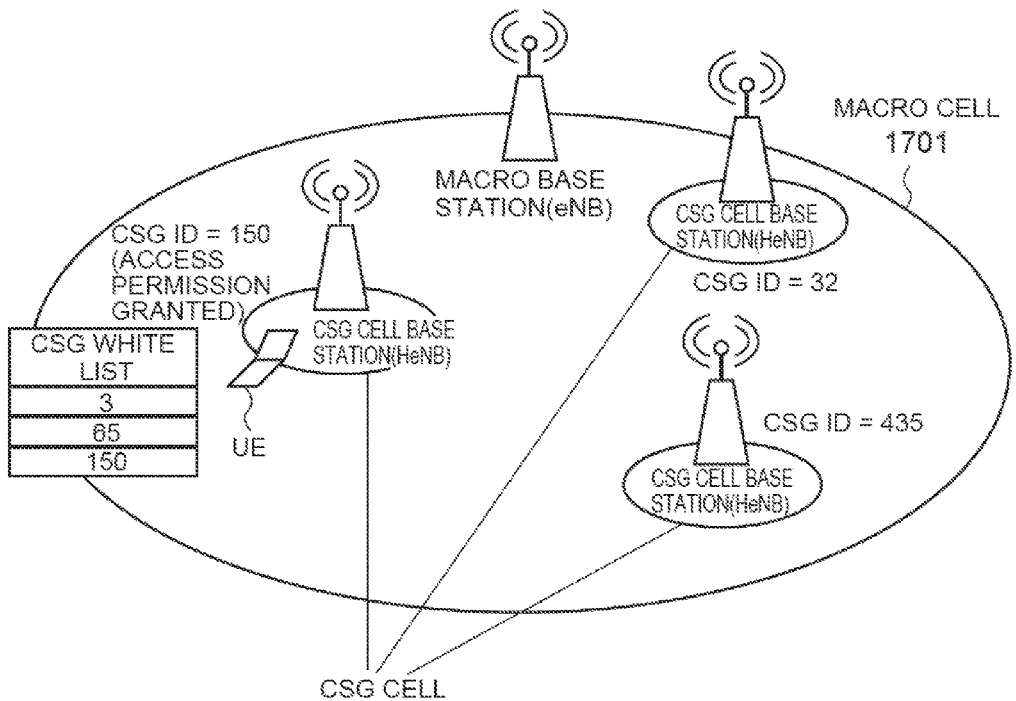
FIG. 17 is a diagram of an example of a configuration of a conventional CSG cell system.
Figure 18:
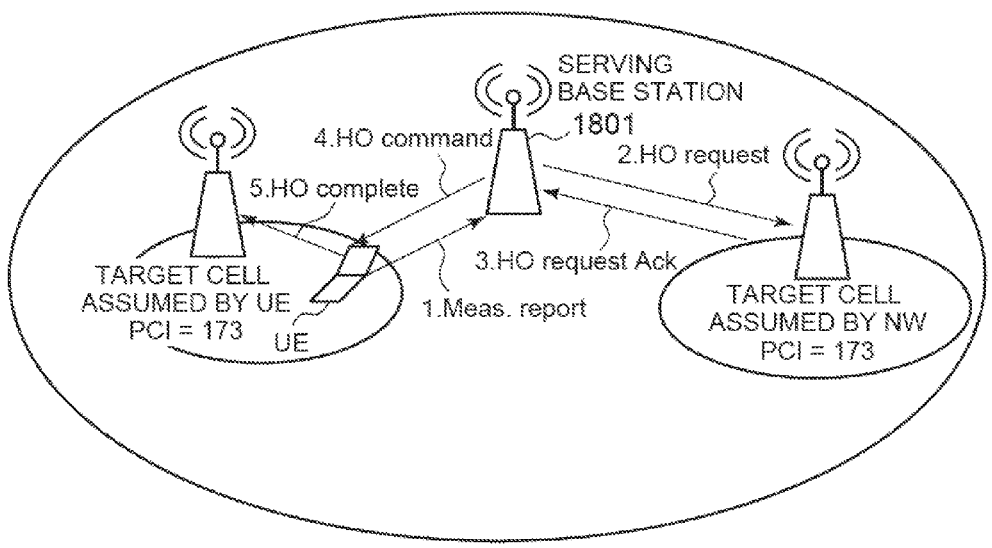
FIG. 18 is a diagram of an example of conventional PCI confusion.
Figure 19:
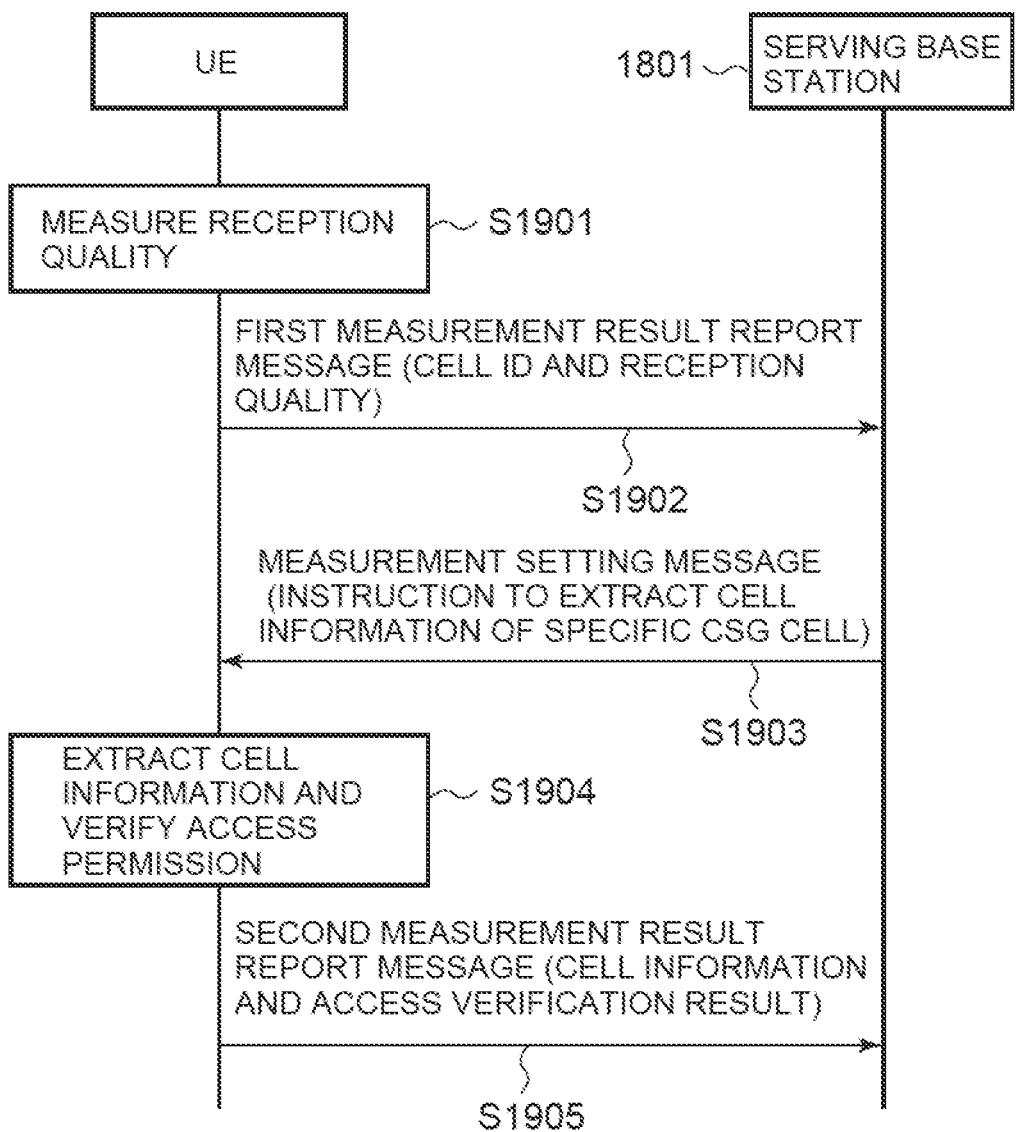
FIG. 19 is a sequence chart of an example of a conventional processing sequence of a measurement result report message including a CSG cell.
Figure 20:
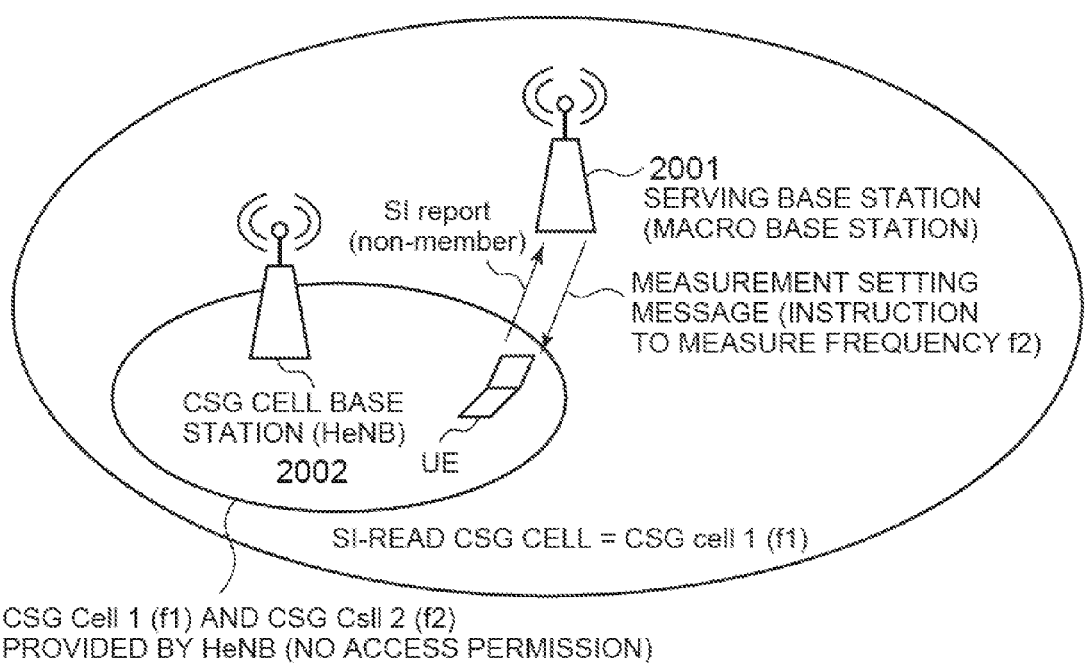
FIG. 20 is a diagram of an example of conventional base station operations when access permission is not granted.

An example of a processing sequence according to the fifth embodiment will be described with reference to FIG. 16. As shown in FIG. 16, the CSG cell base station 1400 gives notification of the notification information including the frequency information and access permission information of all CSG cells provided by the same HeNB (Step S1601). The UE 1500 performs extraction of cell information from the received notification information and performs access permission verification (Step S1602). The UE 1500 judges whether or not access permission is granted (Step S1603). When access permission is not granted, the UE 1500 extracts the frequency information and the access permission information (Step S1604). The UE 1500 performs access permission verification using the access permission information of another CSG cell included in the notification information of the "non-member" CSG cell (Step S1605) and selects the frequency information of the "non-member" CSG cell (Step S1606).

The UE 1500 generates the second measurement result report message including the selected frequency information and transmits the second measurement result report message to the serving base station (Step S1607). The serving base station that has received the second measurement result report message instructs the UE to measure a frequency other than the frequency of the CSG cell of which notification has been received. In other words, to make the UE measure a frequency other than the frequency of the CSG cell of which notification has been received, the serving base station generates a command or the like giving an instruction to select a frequency other than the frequency of the CSG cell of which notification has been given (measured frequency selection) (Step S1608). The serving base station generates a measurement setting message including the generated command (measured frequency information) and transmits the measurement setting information to the UE 300 (Step S1609). At Step S1603, when judged that access permission is granted, conventional operations are performed.

Sixth Embodiment

According to a sixth embodiment, unlike that according to the above-described first to fifth embodiments, each CSG cell is not required to notify information of other CSG cells provided by the same HeNB as notification information. This can be actualized by the UE simultaneously receiving a plurality of bands using a technology referred to as carrier aggregation discussed as a band expansion technology. As a result of the UE providing a gap at the same timing for a plurality of frequency bands at this time, the UE receives system information related to the CSG cells of a plurality of frequencies of which notification has been received from a different HeNB while the UE is not receiving data. Because each CSG cell provided by the same HeNB transmits the notification information at the same timing, the UE can receive the system information of the CSG cells having differing frequencies provided by the same HeNB in the gap provided at the same timing, and can extract cell information and verify access permission for each cell.

The frequency band selected when the UE receives the system information of a plurality of frequency bands is not only the frequency indicated to the UE by the serving base station. In addition, the UE selects the frequency band based on cell information of past connections held in advance by the UE as fingerprints. As a result of the UE performing access verification based on the system information of the CSG cells of a plurality of frequency bands, when it becomes known that access permission is not granted for all CSG cell, or in other words, when a "non-member" CSG cell is detected, the UE notifies the serving base station of the cell information of the detected "non-member" CSG cell by the second measurement result report message. The UE may also notify the serving base station of frequency information other than the frequency information indicated by the serving base station, by the second measurement result report message (in other words, a control means generates and gives notification of a first message including at least frequency information other than the frequency information indicated by a connecting base station to which it is currently connected, among the extracted frequency information).

If the HeNB synchronizes timing between HeNBs using, for example, global positioning system (GPS), the UE may include, in the second measurement result report message, cell information of a non-member CSG cell provided by another HeNB detected simultaneously in addition to the HeNB providing the cell indicated by the serving base station (in other words, in an instance in which a plurality of base stations are synchronized with one another, when the frequency information of a cell provided by another base station is included in the extracted frequency information, the control means generates a first message including at least the frequency information of the cell provided by the other base station). Next, the serving base station that has received the second measurement result report message instructs the UE to measure a frequency other than the frequency of which notification has been given by the second measurement result report message, in a manner similar to that according to the above-described first to fifth embodiments. As the frequency indicated by the serving base station for measurement, for example, the frequency first meets the above-described conditions and is not performing system information reception. In addition, a method is considered in which a frequency is selected that corresponds to a cell having high reception quality of which notification is given by a first measurement result report message.

The second measurement result report message transmitted by the UE may include frequency information of which a CSG cell could not be detected (in other words, the control means generates a first message including at least frequency information that is not extracted by the extracting means). In this instance, the serving base station that has received the second measurement result report message instructs the UE to measure the frequency that does not have a CSG cell of which notification has been given by the second measurement result report message, or in other words, the frequency of a macro cell that has no CSG cell capable of causing interference with the macro cell.

According to the sixth embodiment, unlike that according to the above-described first to fifth embodiments, each CSG cell does not give notification of information of other CSG cells provided by the same HeNB as the notification information. Repeated measurement of a CSG cell for which access permission is not granted can be prevented, and waste of wireless resources can be prevented. In addition, the UE can quickly give notification of a cell to which handover can be performed.

Figure 21:
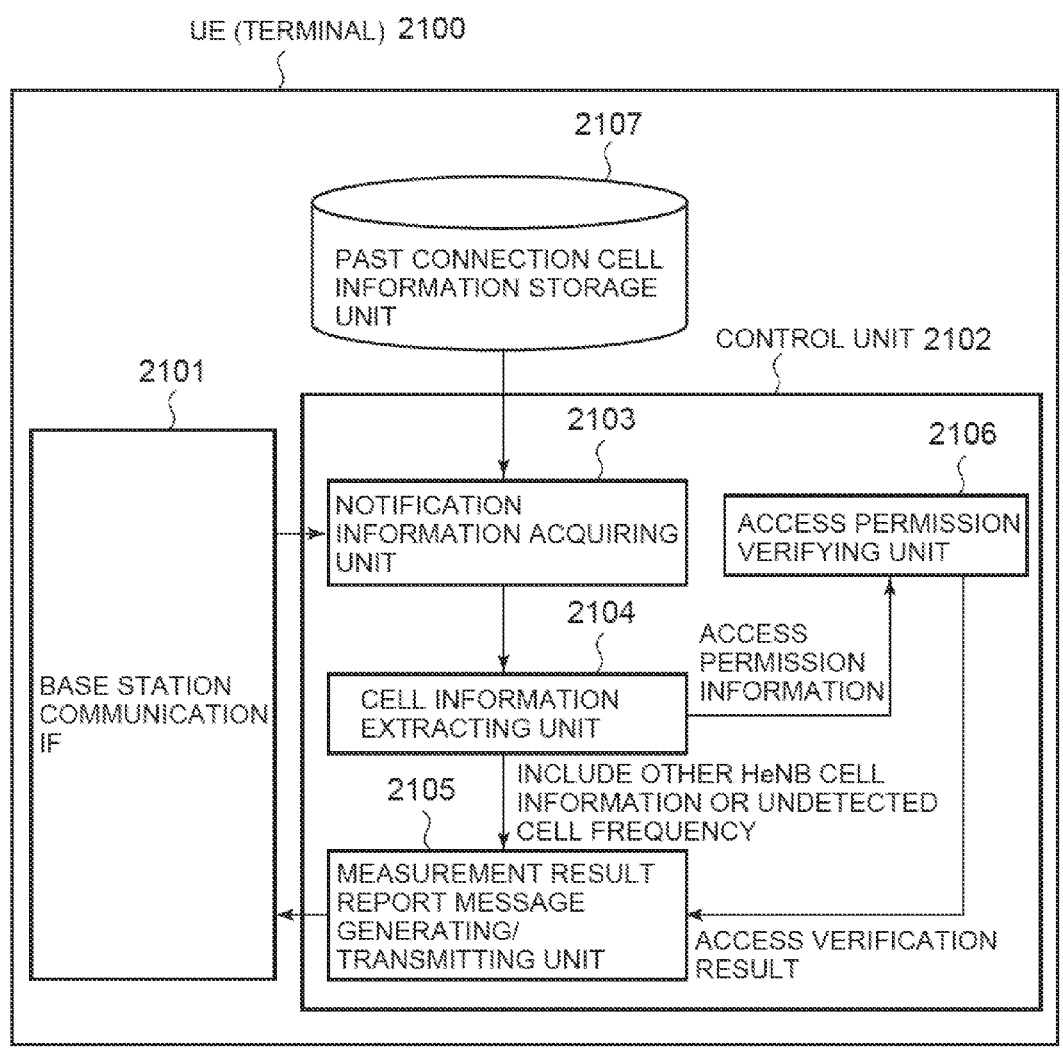
FIG. 21 is a configuration diagram of an example of a configuration of a UE according to a sixth embodiment of the present invention.

Here, an example of a configuration of the UE according to the sixth embodiment is shown in FIG. 21. The configuration of the CSG cell is the configuration of an ordinary CSG cell. Therefore, description thereof is omitted. As shown in FIG. 21, a UE 2100 is configured by a base station communication IF 2101, a control unit 2102, and a past connection cell information storage unit 2107. The control unit 2102 is configured by a notification information acquiring unit 2103, a cell information extracting unit 2104, a measurement result report message generating/transmitting unit 2105, and an access permission verifying unit 2106.

The past connection cell information storage unit 2107 stores cell information of past connections as fingerprints, and is used when selecting a reception frequency and the like. As described above, the cell information extracting unit 2104 extracts "non-member" cell information differing from the frequency of the indicated cell, and extracts cell information of non-member CSG cell provided by another HeNB detected simultaneously in addition to the HeNB providing the cell indicated by the serving base station. The measurement result report message generating/transmitting unit 2105 generates a message including extracted "non-member" frequency information, frequency information that has not been extracted, and the like, and transmits the generated message to the serving base station. Other constituent elements are similar to, for example, those of the UE according to the above-described first embodiment. Therefore, descriptions thereof are omitted.

Figure 22:
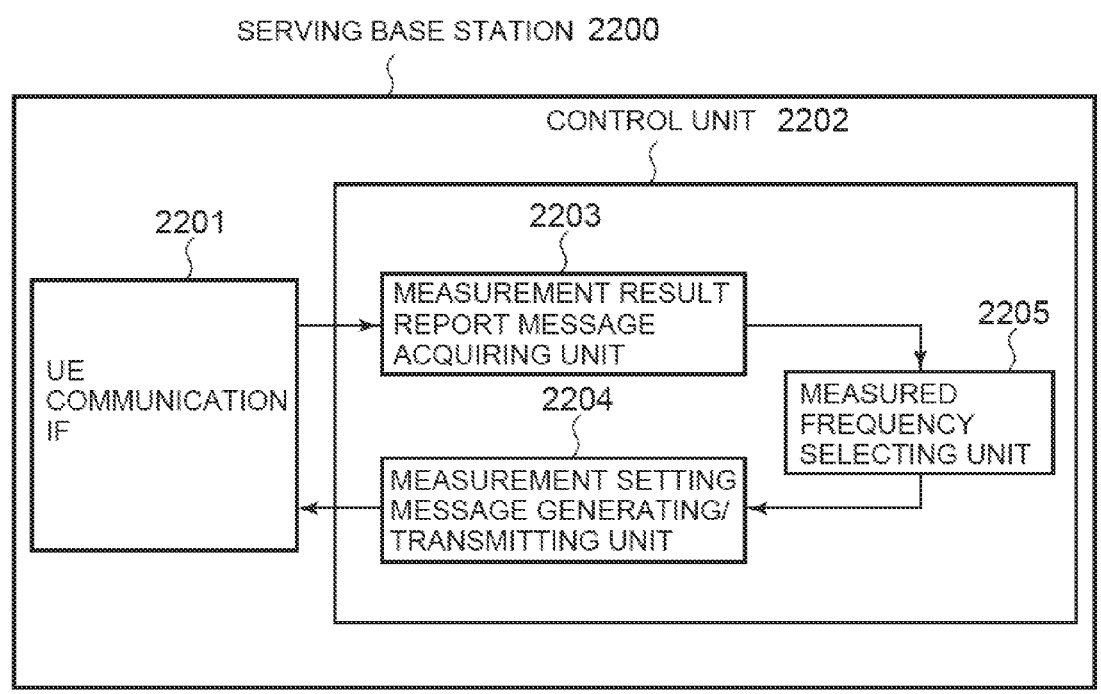
FIG. 22 is a configuration diagram of an example of a configuration of a serving base station according to the sixth embodiment of the present invention.

An example of a configuration of the serving base station according to the sixth embodiment is shown in FIG. 22. As shown in FIG. 22, a serving base station 2200 is configured by a UE communication IF 2201 and a control unit 2202. The control unit 2202 is configured by a measurement result report message acquiring unit 2203, a measurement setting message generating/transmitting unit 2204, and a measured frequency selecting unit 2205. The measured frequency selecting unit 2205 may select a frequency other than the frequency included in the message received via the measurement result report message acquiring unit 2203 in a manner similar to, for example, the above-described first embodiment. In addition, when a message including frequency information that has not been extracted by the cell information extracting unit 2104 of the UE 2100 is received, the measured frequency selecting unit 2205 selects the included frequency.

In addition, the measured frequency selecting unit 2205 may select a specific frequency. In other words, as described above, for example, the measured frequency selecting unit 2205 may select a frequency that meets the above-described conditions and is not performing system information reception, and corresponds to a cell having high reception quality of which notification has been given in the first measurement result report message. Other constituent elements are similar to, for example, those of the UE according to the above-described first embodiment. Therefore, descriptions thereof are omitted.

A process according to the sixth embodiment will be described with reference to FIG. 23. As shown in FIG. 23, the UE 2100 selects the frequency to be received (Step S2301). The UE 2100 receives notification information from a plurality of cells (Step S2302). The UE 2100 performs extraction of cell information and access permission verification based on the received notification information (Step S2303). The UE 2100 judges whether or not access permission is granted for even one cell (Step S2304). When access permission is not granted at all, the UE 2100 extracts the frequency information (Step S2305) and transmits the second measurement result report message including the extracted frequency information (Step S2306). The serving base station 2200 that has received the second measurement result report message performs selection of the frequency to be measured (Step S2307) and transmits a measurement setting message including the measured frequency information (Step S2308). At Step S2304, when judged that access permission is granted for even one cell, the processing transitions to the conventional operations.

Each functional block used in the descriptions of the embodiments of the present invention, described above, can be actualized as a large scale integration (LSI) that is typically an integrated circuit. Each functional block can be individually formed into a single chip. Alternatively, some or all of the functional blocks can be included and formed into a single chip. Although referred to here as the LSI, depending on differences in integration, the integrated circuit can be referred to as the integrated circuit (IC), a system LSI, a super LSI, or an ultra LSI.

The method of forming the integrated circuit is not limited to LSI and can be actualized by a dedicated circuit or a general-purpose processor. A field programmable gate array (FPGA) that can be programmed or a reconfigurable processor of which connections and settings of the circuit cells within the LSI can be reconfigured can be used after LSI manufacturing.

Furthermore, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

The handover preprocessing system, the mobile terminal, and the base station are capable of eliminating waste of resources used as a result of notification being reissued of a CSG cell for which access permission is not granted, and therefore, are useful as a handover preprocessing system, a mobile terminal, and a base station in which the handover preprocessing system performs handover preprocessing performed when specifying a handover destination of a mobile terminal.

A base station to which a mobile terminal is currently connected in a handover preprocessing system that performs preprocessing for specifying a handover destination of the mobile terminal, the base station comprising:

a receiving means for receiving a first message when the mobile terminal that has received notification information transmitted from a connection object base station that is an object for connection of the mobile terminal, the notification information including frequency information of each of a plurality of cells provided by the base station and indicating a range accessible by the mobile terminal, verifies access permission for the cells based on the notification information and the access permission is not granted, the first message being generated by the mobile terminal and including frequency information corresponding to the cell for which the access permission is not granted; and a control means for generating a second message including a command giving an instruction to select a frequency other than a frequency specified by the frequency information included in the first message, based on the received first message, and transmitting the second message to the mobile terminal.

A handover preprocessing system that performs preprocessing for specifying a handover destination of a mobile terminal, the handover preprocessing system comprising:

the mobile terminal that receives notification information within a predetermined period, the notification information including frequency information that is the same as the frequency information selected in advance among frequency information of each of a plurality of cells provided by a base station that is an object for connection of the mobile terminal and indicating a range accessible by the mobile terminal, verifies access permission for the cells based on the received notification information and, when the access permission is not granted, generates a first message including frequency information corresponding with the cell for which the access permission is not granted and transmits the first message to a connecting base station to which the mobile terminal itself is currently connected; and the connecting base station that transmits, to the mobile terminal, a second message including a command giving an instruction to select a frequency other than a frequency specified by the frequency information included in the first message, based on the first message received from the mobile terminal.

A base station to which a mobile terminal is currently connected in a handover preprocessing system that performs preprocessing for specifying a handover destination of the mobile terminal, the base station comprising:

a receiving means for receiving a first message, when the mobile terminal that has received notification information with a predetermined period, the notification information including frequency information that is the same as the frequency information selected in advance among frequency information of each of a plurality of cells provided by a connection object base station that is an object for connection of the mobile terminal and indicating a range accessible by the mobile terminal, verifies access permission for the cells based on the notification information and, when extracting frequency information corresponding to the cell for which the access permission is not granted, generates the first message including at least frequency information that is not extracted; and a control means for generating a second message including a command giving an instruction to select a frequency specified by the frequency information that is not extracted included in the first message, based on the received first message, and transmitting the second message to the mobile terminal.

The invention claimed is:

1. A handover preprocessing system that performs preprocessing for specifying a handover destination of a mobile terminal, the handover preprocessing system comprising:
    a base station that is an object for connection of the mobile terminal, provides a plurality of cells indicating a range accessible by the mobile terminal, and transmits, to the mobile terminal, notification information including frequency information of each cell;
    the mobile terminal that verifies access permission for the cells based on the notification information received from the base station and, when the access permission is not granted, generates a first message including frequency information corresponding to a cell or cells for which the access permission is not granted and transmits the first message to a connecting base station to which the mobile terminal itself is currently connected; and
    the connecting base station that transmits, to the mobile terminal, a second message including a command giving an instruction to select a frequency other than a frequency specified by the frequency information included in the first message, based on the first message received from the mobile terminal.

2. The handover preprocessing system according to claim 1, wherein the base station transmits, to the mobile terminal, the notification information as the notification information including frequency information of a cell having equivalent or greater coverage than the coverage of the base station itself.

3. The handover preprocessing system according to claim 1, wherein:
    the base station includes coverage information of the cells in the notification information and transmits the notification information to the mobile terminal; and
    the mobile terminal measures reception quality of the cell for which the access permission is not granted when generating the first message and, when the reception quality is a predetermined threshold value or more, generates the first message as a message including the frequency information corresponding to the cell for which the access permission is not granted and, when the reception quality is less than the predetermined threshold value, generates the first message as a message including frequency information of a cell having equivalent or greater coverage than the coverage of a relevant cell.

4. The handover preprocessing system according to claim 1, wherein the base station transmits, to the mobile terminal, the notification information as a notification information including frequency information of a cell of which access permission information is the same, the access permission information for judging whether or not access to the cell is possible.

5. The handover preprocessing system according to claim 1, wherein:
    the base station includes access permission information for judging whether or not access to the cell is possible in the notification information and transmits the notification information to the mobile terminal; and the mobile terminal performs verification processing for access permission for another cell using the access permission information included in the notification information of the cell for which the access permission is not granted when generating the first message, and generates the first message as a message including the frequency information corresponding to the cell for which the access permission is not granted.

6. The handover preprocessing system according to claim 2, wherein the base station is a home base station (HeNB) and the cell having equivalent or greater coverage is one of a plurality of cells constructed by the HeNB.

7. The handover preprocessing system according to claim 3, wherein the cell having equivalent or greater coverage and the relevant cell are cells constructed by separate HeNBs.

8. A mobile terminal in a handover preprocessing system that performs preprocessing for specifying a handover destination of the mobile terminal, the mobile terminal comprising:
   a receiving means for receiving notification information from a base station, the base station being an object for connection of the mobile terminal, providing a plurality of cells indicating a range accessible by the mobile terminal, and transmitting the notification information including frequency information of each cell;
   an access permission verifying means for verifying access permission for the cells based on the received notification information;
   an extracting means for extracting, when the access permission is not granted, frequency information corresponding to the cell for which the access permission is not granted; and
   a control means for generating a first message including the extracted frequency information and transmitting the first message to a connecting base station to which the mobile terminal itself is currently connected.

9. The mobile terminal according to claim 8, further comprising:
   a judging means for measuring, after the notification information further including coverage information of the cells is received from the base station via the receiving means, reception quality of the cell for which the access permission is not granted and judging whether or not the mobile terminal itself is near the base station, when generating the first message; and
   a selecting means for selecting, when judged that the reception quality is a predetermined threshold value or more, the frequency information corresponding to the cell for which the access permission is not granted and, when judged that the reception quality is less than the predetermined threshold value, selecting frequency information of a cell having equivalent or greater coverage than the coverage of a relevant cell, wherein
   the control means generates the first message as a message including the selected frequency information.

10. The mobile terminal according to claim 8, further comprising:
   a selecting means for selecting the frequency information corresponding to the cell for which the access permission is not granted, when, after receiving the notification information further including access permission information from the base station via the receiving means, the access permission information for judging whether or not access to the cell is possible, the extracting means extracts the access permission information included in the notification information of the cell for which the access permission is not granted when generating the first message, and the access permission verifying means performs verification processing for access permission for another cell using the extracted access permission information, wherein
   the control means generates the first message as a message including the selected frequency information.

11. A base station that is an object for connection of a mobile terminal in a handover preprocessing system that performs preprocessing for specifying a handover destination of the mobile terminal, the base station comprising:
   a storage means for storing notification information including frequency information of each of a plurality of cells provided by the base station and indicating a range accessible by the mobile terminal; and
   a control means for acquiring the frequency information of the cells from the storage means, generating a notification information including the acquired frequency information, and transmitting the notification information to the mobile terminal.

12. The base station according to claim 11, wherein the control means transmits, to the mobile terminal, the notification information as the notification information including frequency information of a cell having equivalent or greater coverage than the coverage of the base station itself.

13. The base station according to claim 11, wherein the control means includes coverage information of the cells in the notification information and transmits the notification information to the mobile terminal.

14. The base station according to claim 11, wherein the control means transmits, to the mobile terminal, the notification information as notification information including frequency information of a cell of which access permission information is the same, the access permission information for judging whether or not access to the cell is possible.

15. The base station according to claim 11, wherein the control means includes access permission information for judging whether or not access to the cell is possible in the notification information and transmits the notification information to the mobile terminal.

16. The base station according to claim 12, wherein the base station is a home base station (HeNB) and the cell having equivalent or greater coverage is one of a plurality of cells constructed by the HeNB.

17. A mobile terminal in a handover preprocessing system that performs preprocessing for specifying a handover destination of the mobile terminal, the mobile terminal comprising:
   a frequency selecting means for selecting, in advance, frequency information to be received;
   a receiving means for receiving notification information within a predetermined period, the notification information including frequency information that is the same as the selected frequency information among frequency information of each of a plurality of cells provided by a base station that is an object for connection of the mobile terminal and indicating a range accessible by the mobile terminal;
   an access permission verifying means for verifying access permission for the cells based on the received notification information;
   an extracting means for extracting, when the access permission is not granted, frequency information corresponding to the cell for which the access permission is not granted; and
   a control means for generating a first message including the extracted frequency information and transmitting the first message to a connecting base station to which the mobile terminal itself is currently connected.

18. The mobile terminal according to claim 17, wherein the control means generates the first message including at least frequency information other than frequency information indicated by the connecting base station to which the mobile terminal is currently connected, among the extracted frequency information.

19. The mobile terminal according to claim 17, wherein the control means generates, in an instance in which a plurality of base stations are synchronized with one another, when frequency information of a cell provided by other base station is included in the extracted frequency information, the first message including at least the frequency information of the cell provided by the other base station.

20. The mobile terminal according to claim 17, wherein the control means generates the first message including at least frequency information that is not extracted by the extracting means.

* * * * *